(12) United States Patent
Yazdansepas et al.

(10) Patent No.: US 12,303,797 B2
(45) Date of Patent: May 20, 2025

(54) METHODS, SYSTEMS, APPARATUSES, AND DEVICES FOR FACILITATING A GAMEPLAY

(71) Applicants: Iman Yazdansepas, Santa Clara, CA (US); Mitra Khanibaseri, Santa Clara, CA (US)

(72) Inventors: Iman Yazdansepas, Santa Clara, CA (US); Mitra Khanibaseri, Santa Clara, CA (US)

( * ) Notice: Subject to any disclaimer, the term of this patent is extended or adjusted under 35 U.S.C. 154(b) by 658 days.

(21) Appl. No.: 17/570,209

(22) Filed: Jan. 6, 2022

(65) Prior Publication Data

US 2022/0212093 A1 Jul. 7, 2022

Related U.S. Application Data

(60) Provisional application No. 63/134,291, filed on Jan. 6, 2021.

(51) Int. Cl.
| | |
|---|---|
| *A63F 3/00* | (2006.01) |
| *G06Q 20/36* | (2012.01) |
| *G07F 17/32* | (2006.01) |
| *H04L 9/32* | (2006.01) |

(52) U.S. Cl.
CPC ..... *A63F 3/00643* (2013.01); *G06Q 20/3678* (2013.01); *G07F 17/3244* (2013.01); *H04L 9/3213* (2013.01); *A63F 2003/00662* (2013.01); *H04L 2209/56* (2013.01)

(58) Field of Classification Search
CPC ............. A63F 3/00643; A63F 3/00697; A63F 2003/00662; A63F 2003/00719; A63F 9/0468; A63F 2009/2447; A63F 2009/2457; A63F 2009/2488; A63F 2009/2489; G06Q 20/3678; G07F 17/3244; H04L 9/3213; H04L 2209/56
See application file for complete search history.

(56) References Cited

U.S. PATENT DOCUMENTS

| | | | |
|---|---|---|---|
| 7,755,605 B2 | 7/2010 | Daniel | |
| 9,694,275 B2 | 7/2017 | Hawkins | |
| 2009/0104988 A1* | 4/2009 | Enge | A63F 3/00643 463/31 |

(Continued)

FOREIGN PATENT DOCUMENTS

GB 2467370 B 3/2014

*Primary Examiner* — Werner G Garner

(57) ABSTRACT

Disclosed herein is an apparatus for facilitating a gameplay, in accordance with some embodiments. Accordingly, the apparatus comprises a game board and a game piece. Further, the game board comprises a playing surface comprising markings. Further, the game piece comprises piece surfaces. Further, the game piece is positioned on the playing surface such that one of the piece surfaces is disposed over one of the markings. Further, the game piece comprises a sensor, a processing device, a storage device, and a presentation device. Further, the sensor generates sensor data based on the disposing of the one of the piece surfaces over the one of the markings. Further, the processing device analyzes the sensor data and identifies the one of the markings. Further, the storage device retrieves one of the information corresponding to the one of the markings. Further, the presentation device presents the one of the information.

18 Claims, 23 Drawing Sheets

(56) References Cited

U.S. PATENT DOCUMENTS

| | | |
|---|---|---|
| 2010/0194683 A1 | 8/2010 | Piper |
| 2014/0152646 A1 | 6/2014 | Kang |
| 2014/0225852 A1 | 8/2014 | Small |
| 2014/0285400 A1* | 9/2014 | Sato .................. G06F 3/1446 |
| | | 345/1.3 |
| 2017/0100661 A1* | 4/2017 | Slav .................. A63F 13/213 |
| 2021/0052981 A1* | 2/2021 | Yi .................. G07F 17/3237 |

* cited by examiner

METHODS, SYSTEMS, APPARATUSES, AND DEVICES FOR FACILITATING A GAMEPLAY

FIELD OF THE INVENTION

Generally, the present disclosure relates to the field of amusement devices. More specifically, the present disclosure relates to methods, systems, apparatuses, and devices for facilitating a gameplay.

BACKGROUND OF THE INVENTION

A vast majority of parents are concerned about their children due to their over-exposure to electronics like smartphones, tablets, etc. Most parents would prefer if children played with board games and other traditional toys, instead of electronic devices. Unfortunately, in today's era, traditional games such as board games may not provide any incentive or may not be as interesting as electronic devices.

Certainly, there is a need for combining the current state of electronic devices with the characteristic of traditional games/toys.

Therefore, there is a need for improved methods, systems, apparatuses, and devices for facilitating a gameplay that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating a gameplay, in accordance with some embodiments. Accordingly, the apparatus may include a game board and a game piece. Further, the game board may include at least one playing surface. Further, the at least one playing surface may include a plurality of markings. Further, the plurality of markings corresponds to a plurality of information associated with the gameplay. Further, the game piece may include a plurality of piece surfaces. Further, the game piece may be configured to be positioned on the at least one playing surface. Further, one of the plurality of piece surfaces may be disposed over one of the plurality of markings based on the positioning of the game piece on the at least one playing surface. Further, the game piece may include at least one sensor, a processing device, a storage device, and at least one presentation device. Further, the at least one sensor may be configured for generating at least one sensor data based on the disposing of the one of the plurality of piece surfaces over the one of the plurality of markings. Further, the processing device may be communicatively coupled with the at least one sensor. Further, the processing device may be configured for analyzing the at least one sensor data. Further, the processing device may be configured for identifying the one of the plurality of markings based on the analyzing. Further, the storage device may be communicatively coupled with the processing device. Further, the storage device may be configured for retrieving one of the plurality of information corresponding to the one of the plurality of markings based on the identifying. Further, the at least one presentation device may be communicatively coupled with the storage device. Further, the at least one presentation device may be configured for presenting the one of the plurality of information based on the retrieving.

Further disclosed herein is an apparatus for facilitating a gameplay, in accordance with some embodiments. Accordingly, the apparatus may include a game board and a game piece. Further, the game board may include at least one playing surface. Further, the at least one playing surface may include a plurality of markings. Further, the plurality of markings corresponds to a plurality of information associated with the gameplay. Further, the game piece may include a plurality of piece surfaces. Further, the game piece may be configured to be positioned on the at least one playing surface. Further, one of the plurality of piece surfaces may be disposed over one of the plurality of markings based on the positioning of the game piece on the at least one playing surface. Further, the game piece may include at least one three-dimensional object. Further, the at least one three-dimensional object may include a plurality of panels. Further, the plurality of panels may be arranged in at least one configuration for forming one of the at least one three-dimensional object. Further, a plurality of external surfaces of the plurality of panels forms the plurality of piece surfaces. Further, the game piece may include at least one sensor, a processing device, a storage device, and at least one presentation device. Further, the at least one sensor may be configured for generating at least one sensor data based on the disposing of the one of the plurality of piece surfaces over the one of the plurality of markings. Further, the processing device may be communicatively coupled with the at least one sensor. Further, the processing device may be configured for analyzing the at least one sensor data. Further, the processing device may be configured for identifying the one of the plurality of markings based on the analyzing. Further, the storage device may be communicatively coupled with the processing device. Further, the storage device may be configured for retrieving one of the plurality of information corresponding to the one of the plurality of markings based on the identifying. Further, the at least one presentation device may be communicatively coupled with the storage device. Further, the at least one presentation device may be configured for presenting the one of the plurality of information based on the retrieving.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

DETAIL DESCRIPTIONS OF THE INVENTION

Figure 1:
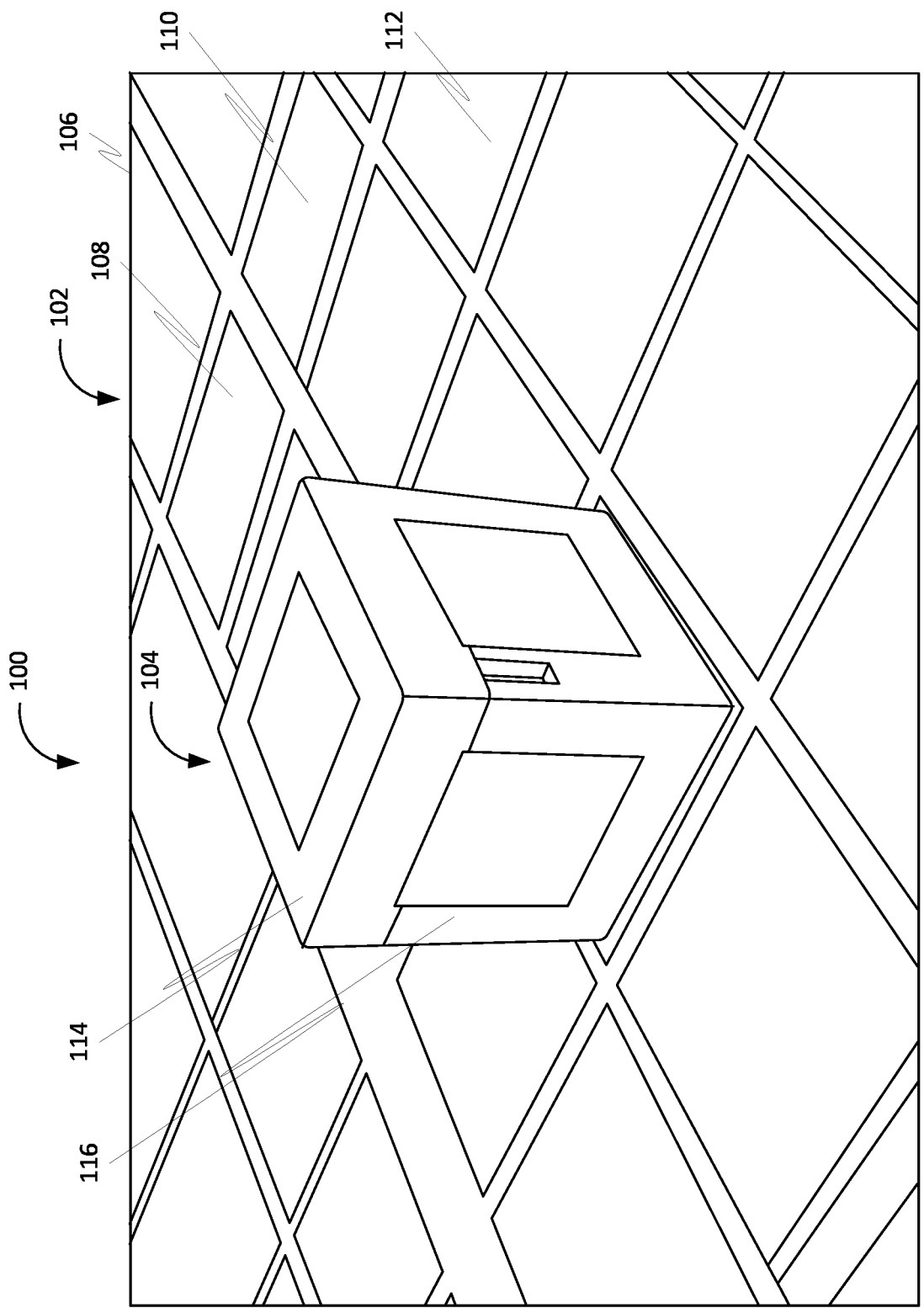
FIG. 1 is a perspective view of an apparatus for facilitating a gameplay, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating a gameplay, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating a gameplay. Further, the present disclosure describes a solution to the over-exposure of electronics at a young age, while still providing a traditional-looking and traditional-based interactive toy. The present disclosure describes a hex display cube similar to letter-display cubes or image-display cubes but provides a variety of electronic components which enable a variety of configurations and methods which provide a vast amount of entertainment. The hex display cube is modular and user-interactive; thus, it comprises hardware components as well as software application methods.

The hex display cube comprises a plurality of Printed Circuit Boards (PCBs). For the preferred embodiment, the hex display cube comprises six side display PCBs and one mainboard PCB. Thus, the preferred number of PCBs for the hex display cube is seven but is not limited to such arrangement and configuration. Similarly, the hex display cube is not limited to only one mainboard PCB, but rather that is the preferred configuration for the preferred embodiment of the hex display cube.

The plurality of PCBs of the hex display cube is arranged to form a cubical geometric profile. The mainboard is enclosed in the center of the assembly, meanwhile, the six display PCBs comprise the sides of the hex display cube. The mainboard PCB directly assembles with four of the six side display PCBs via a pin connector or any type of fastening method commonly used in the industry.

Thus, the four side display PCBs assembled with the mainboard is evenly distributed around the perimeter of the mainboard. The remaining two side display PCBs then are assembled perpendicular to the four side display PCBs assembled with the mainboard PCB. It is important to note that the arrangement and configuration of the plurality of PCBs which comprise the hex display cube are not limited to the aforementioned description and any variation of such based on user, design, or manufacturing requirements is still considered within the scope of the invention.

Additionally, the hex display cube comprises a plurality of Liquid Crystal Displays (LCDs). For the preferred embodiment, the preferred number of LCDs matches the preferred number of side display PCBs from the plurality of PCBs. In this case, the hex display cube comprises six LCDs that are coincident and adjacent to the surface area of the six side display PCBs. The six LCDs are attached to the surface area of the six side display PCBs via double-sided tape or any adhesive/fastening method.

Furthermore, for the preferred embodiment, the hex display cube comprises a display enclosure. The display enclosure functions as a housing for the hex display cube. It is important to note that the hex display cube is not limited to the display enclosure, since it is fully functional without the display enclosure. The enclosure for the cube is not limited to just a cubical enclosure. It can be any shape from a sphere to a dino or any other animal shape. The hex display cube also comprises a plurality of electronic ports, a plurality of sensors, a plurality of network connectivity elements and network connectivity methods, a plurality of projectors, a speaker, and a vibration element.

The hex display cube comprises a Universal Serial Bus (USB) port and a Secure Digital (SD) card port from the plurality of electronic ports. Furthermore, the hex display cube is not limited to a USB port and a SD card port, but rather any and all ports of standard use in the industry. Additionally, the hex display cube comprises a color light sensor, as well as a gyroscopic sensor from the plurality of sensors. Similarly, the hex display cube is not limited to two or more color light sensors and a gyroscopic sensor, but rather any and all sensors of standard use in the industry. The color light sensor and the gyroscopic sensor provide input data for one of the software method applications for the hex display cube.

Additionally, the hex display cube may include Wireless Fidelity (WiFi) network connectivity elements and network connectivity methods, as well as Bluetooth network connectivity elements and network connectivity methods. Similarly, the hex display cube is not limited to such network connectivity elements and network connectivity methods but rather may comprise any and all standard network connectivity elements and network connectivity methods.

Furthermore, the hex display cube comprises a plurality of projectors. For the preferred embodiment of the hex display cube, the preferred number of projectors is four but is not limited to such. The projector is able to project any shape or picture. The projector may use the laser beam projection method.

Additionally, the hex display cube comprises a speaker or a plurality of speakers. The speaker or plurality of speakers may be arranged anywhere on an outer feasible surface of the assembly for the hex display cube or anywhere on an inner feasible surface of the assembly for the hex display cube.

The hex display cube is not limited to a particular size, but rather is suitable for any set of feasible dimensions. The hex display cube also comprises a backlight LCD controller on each side display PCB of the plurality of PCBs. Furthermore, the location of the aforementioned sensors may be on any feasible surface of the assembly for the hex display cube. The hex display cube may also comprise a single push-button or a plurality of push-buttons distributed in any configuration on any feasible surface of the assembly for the hex display cube. Similar to the location of the speaker or the plurality of speakers, the locations for the plurality of electronic ports may be positioned on any feasible surface of the assembly for the hex display cube. The plurality of electronic ports may be at a readily available location, or in a more internal location, not easily accessible.

Furthermore, the hex display cube comprises an Input/Output (I/O) expander, a battery connector, a microcontroller, and/or a microprocessor. Additionally, the hex display cube comprises a microphone, a battery management chip, a USB management chip, and/or any supplemental elements for the software method applications for the hex display cube.

As previously mentioned, the assembly of the hex display cube comprises six side display PCBs and a mainboard PCB. The aforementioned description suggests a connector-like element or pin connector for such fastening purposes. In an alternate embodiment, the configuration of the assembly remains the same, but the fastening means vary. The gap and edge method is an alternate fastening method where the mainboard PCB comprises four protruding members. A protruding member on every side of the PCB allows for a direct assembly with four side display PCBs from the plurality of PCBs. Meanwhile, the remaining two side display PCBs fasten perpendicular with respect to the four side display PCBs via standard pin connectors or any similar method.

In a further alternate embodiment, the assembly of the six side display PCBs and the mainboard PCB from the plurality of PCBs occurs via a magnet connector method. The magnet connector method is similar to the gap and edge method. Instead of a gap and edge, the mainboard comprises a plurality of magnetic connectors, and the six side display PCBs comprise a plurality of metal connectors. The plurality of magnetic connectors and the plurality of metal connectors latch on to each other in order to fasten the plurality of PCBs together for the assembly of the hex display cube.

A different alternate embodiment comprises a modular configuration for the hex display cube. Meaning, that all components such as sensors, actuators, and displays are removable and exchangeable. For the modular configuration embodiment, the hex display cube is most effective if using the magnet connector method for the plurality of PCBs. The magnet connector method ensures the ease of removable and interchangeable components from the hex display cube.

As previously stated, the plurality of sensors, the plurality of ports, and the plurality of network connectivity elements and network connectivity methods are not limited to the aforementioned descriptions.

Some additional examples of other components include but are not limited to light sensors, gyroscopic sensors, humidity sensors, temperature sensors, pressure sensors, ultrasonic sensors, Radio Frequency Identification (RFID) sensors, magnetic field Hall sensors, carbon dioxide level sensors, indoor air quality sensors, and image recognition sensors. Additionally, some additional components may include but are not limited to pulse actuators, a power source, WiFi connectivity and enabling elements, USB ports, and USB managing elements, battery management modules, wireless data transmission connection, and enabling elements such as Bluetooth, LCD displays, SD card ports, LED matrix, keypads, motors, speakers, voltmeter, vibration element, and solar cells.

These and all hardware components mentioned for the hex display cube may vary in number and location within the assembly for the hex display cube, any modification which occurs due to user, manufacturing, or design requirements is still within the scope of the hex display cube.

Furthermore, the hex display cube comprises linkable capabilities, meaning the hex display cube is able to connect to another hex display cube. The linkable capabilities also include the physical assembly of one side of a hex display to another side of a hex display cube. Thus, the hex display cube may be arranged with another hex display cube to form a rectangular prism hex display or any feasible geometric profile.

In a further alternate embodiment, the hex display cube comprises wireless charging capabilities. Where the hex display cube comprises wireless charging elements and a wireless charging station. In this further alternate embodiment, all networks and communication occur via WiFi and/or any wireless communication method such as Bluetooth.

Additionally, in this further alternate embodiment, the SD card port is arranged in a more inaccessible location. Furthermore, the hex display cube may also comprise a levitation stand. The levitation stand provides a constant opposing force normal to the hex display cube, thus resulting in constant levitation of the hex display cube. The levitation stand and levitation stand method may comprise a magnetic, electromagnetic, or any feasible method which results in constant and stable levitation of the hex display cube.

The aforementioned description of the hardware components for the hex display cube is only intended for disclosure of the invention and is not intended to limit the scope of the invention. Next, the software methods and applications are discussed with respect to the previously described components and arrangement of the hex display cube.

The hex display cube comprises an animated character method, a smart dice method, an ABC cube learning method, a color learning method, a display picture method, a card-number-picture display method, a trajectory method, a plurality of games method, a programming learning method, a 6D timer method, and an internet radio streamer method.

For the animated character method, the hex display cube comprises an application that allows an animated character to be displayed on all side displays from the hex display cube. The animated character may move within the side displays, while also zooming in or out of the frame.

Furthermore, the default action of the animated character is to try to escape the hex display cube. The animated character may also include a plurality of actions which include but are not limited to singing, dancing, and responding to a question. Additionally, the animated character method integrates the vibration element for a combination of animated character action with the activation of the vibration element.

For the smart dice method, the hex display cube shows a random number on each side display for the hex display cube with or without rolling the hex display cube. A variety of display actions are available in the smart dice method such as but not limited to tapping the dice, placing the color light sensor on a different color, rotating the hex display cube, sending a message from a cellular device to the hex display cube via Bluetooth, and any movement or input from the user. Meaning, the hex display cube may display different outputs on the side displays based on the various inputs from a user.

Additionally, during the smart dice method, a static number may be assigned to each side of the hex display cube. Although the top face can consider as a primary, but the user can change it via setting menu. Furthermore, if the hex display cube is rolled, the top face is considered the primary side display, and the number rolled may be relayed to a cellular device or any smart device with wireless network connectivity. Furthermore, the smart dice method allows for connectivity around the globe with any available hex display cube. Additionally, pictures or displays are assignable to the hex display cube side displays. Furthermore, the picture or display may be uploaded to the hex display cube via any wireless network connection method from a smart device, laptop, or personal computer (PC). Additionally, the hex display cube also allows for data transfer via a cable or any other means for the available ports on the hex display cube.

For the ABC cube learning method, the hex display cube comprises a static or dynamic display picture of an object or an alphabet letter. The static or dynamic display may change based on user voice input or any other user-based input. When the hex display cube is held by a user, the side display facing the user is considered the primary side. The primary side of the hex display cube may state the current display such as the current alphabet letter or current image. In the ABC learning method, the hex display cube may also sing or project sounds when prompted by a user with any user action.

For the color learning method, the hex display cube identifies color and states the color. The color learning method is triggered by any specific user input, such as placing the light color sensor over a particular color. When the hex display cube is placed over a particular color, the hex display cube identifies, states, and displays the specific color on all side displays.

For the display picture method, the hex display cube displays any pictures/images on all side displays or selected side displays. As previously stated, the images may be transferred via any and all wireless or non-wireless connection methods. For the card-number-display method, the hex display cube displays playing card numbers and pictures for playing any and all available games.

For the trajectory method, the hex display cube displays the trajectory of the hex display cube when the hex display cube is thrown in the air. For the plurality of games method, the hex display cube is capable of initializing any and all games and board games which are compatible with the hex display cube.

For the programming learning method, the hex display cube comprises an application that allows for third party distribution of programming learning platforms in order to facilitate learning programming skills. The programming language can be the smartphone app or a PC/Mac software. For the 6D timer method, the hex display cube allows assigning a timer on each side display or on all side displays. The timer method is further modified and varied via a mobile application or any feasible network connection. Meaning, when the hex display cube is positioned with the corresponding timer display-side, the 6D timer is activated and initiates a count increasing or decreasing accordingly to the user settings. Similarly, with the internet radio streamer method, the hex display cube allows the assignation of various radio stations associated with each side via the mobile application. Thus, the hex display cube streams the corresponding radio station relating to the corresponding side display.

Lastly, the hex display cube also comprises a smartphone or smart device application. The smartphone application displays the hex display cube, where a user may swipe in any direction to rotate the hex display cube and select a corresponding side display. When the corresponding side display is selected, the smartphone application allows a user to assign a variety of displays to the selected side display such as pictures, images, radio stations, and any/all other methods/components from the aforementioned description. Additionally, the user is able to provide direct input to the hex display cube via the smartphone application.

The hex display cube further comprises a music player. The music player is configured such that six different songs of type of music are assigned to the music player. Therefore, the user selects and assigns a song or type of music to each side of the hex display cube. A user performs a song assignment via the smartphone application, or by directly interacting with the hex display cube. Additionally, any and all variations of a music player and all possible arrangements for song assignment based on the display side are considered within the scope of the hex display cube.

Additionally, the hex display cube is not limited to any game, application, and/or configuration. Any and all feasible games may be implemented into the hex display cube. Further, the hex display cube is associated with a board game application, in this application, the cube is used as a board game bead. There is another piece which is a board game. This board game has small square cells with two different colors on each side. When the cube is positioned on those cells two, different colors are picked with the color sensor on the cube. With this mechanism, the cube can recognize which cells it is located on since each cell has unique pairs of colors.

The hex display cube is not limited to the plurality of sensors and/or components, as an alternate component that still achieves the necessary functions for the hex display cube is considered within the scope of the hex display cube. Additionally, the LCD displays comprise touch-screen capability and/or any variation or modification of interactive technology available. The hex display cube is also modular with components and accessories such as keyboards and any similar compatible component.

Further, the present disclosure describes a hex display cube. More specifically, the present disclosure describes an interactive hex display cube intended for learning and entertainment purposes.

Further, the present disclosure describes HexaDisplay, Hexaplay, Cubipax, etc. Further, the HexaDisplay is the Cube with the display on each side. The display size shouldn't be matter, and the HexaDisplay should protect in any size. There may be a sensor such as a color sensor or a light sensor on some sides. There may be a sensor inside the Cube, such as a gyroscope or other sensors. The Cube can be consist of a solid plastic cube with the attached LCD on each side or made by 6 sided PCB with LCD on each side. The PCB can be 1, 2, or more layers. The whole Cube consists of 7 PCB boards, one mainboard, and six sideboards. The displays located on sideboards will refer as LB(LCD board): 4 out of the 6 LB connect with the connector to 4 sides of the mainboard, 2 out of the 6 LB connect from top and bottom to 4 other side LBs, Each side of the LBs connector's positions has different. The different positions of the connectors are considered to prevent miss connecting the side LBs. Each side LBs contained the LCD, connector, and the buffer for LCD. The location of each LBs is in the middle of the LBs. There is a backlight controller on each LBs. On one of the sides, there is a USB and SD card. On each side, the sensors, like a color sensor, can be alongside the LCD. On some side, maybe there is some push-button alongside the LCDs. All sides can have the push button, or it could be haven't any push button. The SD card and USB connector locations could design to be accessible or not accessible. The mainboard is connected in the exact middle of all four sides of LBs. The mainboard also can be connected in any hights of the other four sides of LBs. The mainboard has Bluetooth, Wifi, Speaker, Gyroscope, Vibrator Microphone, battery management chip, USB connector, USB management chip, SD connector, I/O expander, Battery connector, Microcontroller, or microprocessor. There may be more sensors and electronic components located on the mainboard as the future coming application. The mainboard also could be consist of 2 or more PCB boards top each other. The four-sided LBs can be connected to the mainboard(s) with the gap and edge method. This method is used to decrease the number of connectors and also ease assembly. The Gap and edge method mean the mainboard has an edge in the size of the PCB thickness, and the 4 LBs have a gap with the size of PCB thickness. In each LBs and MB, some connectors latch to each other. In this method, all 4 sides LBs can have the same layout. The SD card and USB are located on top or bottom LBs. The top and bottom LBs connect to the mainboard with a flat cable. There is another method which is called the magnet connector. This method is very similar to the "No connector method," but instead of the gap and edge, the mainboard has a magnetic connector, and the LBs have a metal connector. And these two latches to each other. There is another version of the Cube that has other components instead f the LBs. In this version, instead of the LBs on each side, there are different sensors or actuators on each side. Each side could be removable and exchangeable. Most likely, for having this version, the magnet connector version should be used. The components that can use in each side should include but is not limited to, Sensors, (Color, Ligh, Gyroscope, Humidity, Temperatur, Pressure, Distance (Ultrasonic), RFID, Hal sensor, carbon dioxide, indoor air quality, image sensor, Compass, camera, Pulse, etc.), Actuators, power source, and others, wifi USB, battery management, Bluetooth, LCD, SDCard, LED Matrix, Keypad, motor, Speaker, voltmeter, Vibrator, solar cell SD card USB port. In this version, each Cube can be connected to another cube. Each side can connect from all the sides to other sides to fabricate the new shape like a rectangular instead of a cube. The Wireless charger model. In this version, all the communication happened via Bluetooth or wifi. SD cards should be inaccessible if a wireless charger is used. All the information should transfer via BLT or wifi. Levitation stand. Levitate the Cube on some stand. Projector, in top of each side of the Cube there is a projector that can project any picture on the surface this Projector can be any light Projector like laser or regular Projector.

Further, the present disclosure describes a software application associated with the hex display cube. Further, the hex display cube shows small fiction animated characters. All six sides of the fictional character's aspect can observe from each side. The character zooms in and zooms out inside the Cube. The character is always trying to escape from inside the Cube. When the character faces one side, the user can flip that side, and it is trying to meet the other side and say funny stuff. The character can dance, can put the thumb in his mouth and blow itself until it exploded, you can communicate with the character via microphone and voice recognition, can get a response to your question, ask to sing or play music. All the actions that the fictional character does can combine with the vibrator shaking. Further, the hex display cube is used as a smart dice. The smart dice can show the random number on each side without rolling the Cube. The actuator of showing such things includes but is not limited to; tapping the dice, putting the sensor side of the Cube on a different color, rotating the Cube, sending the message from the smartphone via Bluetooth, and any movement or input from the user. The smart dice also can have a static number on each side. When the dice roll, the top face considers as the primary side, and it can send that number to the Smartphone app. You can play dice with anybody on earth using the connected dice via the internet. The picture on each side of the dice can design or select in the app. The pictures or the design can be uploaded to the Cube via Bluetooth, wifi from a smartphone, or PC and MAC. The design or selected picture can also be uploaded to the Cube using a cable from any device such as a computer, tablet, or smartphone. The hex display cube may be used as Kids ABC cube learner. The Cube can have a static or dynamic picture of the object or alphabet. The picture can also be changed according to the user voice or any input that the Cube has. When the user holds the Cube, the side that faces the user is considered the primary side. The primary side can announce the alphabet and also the name of the picture on it. The announcement also can be triggered by any input like voice taping the color of the surface etc. It also can sing with any input's trigger. Further, the hex display cube is used as a Color teacher. with each color, say the color. When the kids put the bottom side or any side that has a sensor of the Cube in any color, all five sides show that color and announce it. Put any pictures you want on each side using the smartphone or any uploading method. Show the different playing card numbers and pictures for playing another game. Show the trajectory of the Cube when it through to the air on an app or computer. Further, the hex display cube is used to transfer shape. Make a bigger cube shape with or without magnifying glass on each side. Sphere shape enclosure that the Cube put in the middle of it. Animal shapes like dinosaurs or any other animal shape that the Cube can go inside it.

Further, the Ball trap game is played using the hex display cube. The Ball trap game shows two or more balls inside it and two or more holes. By moving the Cube, balls move until they get into holes and balance.

Further, the present disclosure describes the ruby Cube and Game board.

Further, the color sensor on one side of the Cube is used for different games. One game could be a board with different pictures on it and a small color code rectangle in the corner of the picture. When locating the bottom side (which is the side with the RGB sensor), the other side shows the picture. Roll the dice and move the Cube according to the number. You will win if all sides show the same picture. Further, the hex display cube uses MIT app inventor and easy coding.tn to give the kids programming ability. And Blockly from google.

Further, the hex display cube provides character check outer. This feature has a board with a few squares with some ambiguous graphic middle of it and the color ribbon around it. When you put the color detector side on this, some fictional character will be alive inside the Cube with all 5 aspects. Next-generation of the Cube should be used foldable display.

Further, the hex display cube provides 6D timer, with this feature, each side can count the desired time, which is set in an app. And it can start if the corresponding side faces up.

Further, the hex display cube provides an Internet Radio streamer. Users can determine different radio stations on each side and when each side is up, the corresponding radio station starts to stream.

Further, the hex display cube is associated with a mobile application (App). Further, the mobile application is an interactive app that shows a cube in the app and the cube spinning left and right and up and down very smoothly with a finger swipe, and when the side is selected, the picture gallery opens, and you can choose a picture. Further, the hex display cube provides the ability to make the program on the app and upload it to the Cube. Further, the hex display cube allows talking to the Cube via the app.

Further, the enclosure for the hex display cube is not limited to just a cubical enclosure. It can be any shape from a sphere to a dino or any other animal shape. Further, the hex display cube may include two or more color sensors. Although the top face can consider as a primary, the user can change it via a setting menu. The programming language can be the smartphone app or a PC/Mac software app.

Further, the hex display cube is associated with a board game application, in this application, the cube is used as a board game bead. There is another piece which is a board game. This board game has small square cells with two different colors on each side. When the cube is positioned on those cells two, different colors are picked with the color sensor on the cube. With this mechanism, the cube can recognize which cells it is located on since each cell has unique pairs of colors. Each pair of colors unlock unique information, This information could be any media like the picture, text instruction, animation, music, speech, etc., This information is not fixed, and every time user start the new game, that information can be changed in each cell or exchange between the cells. The board game can be played with 4 users per cube. If a group of 7 or 8 people wants to play with it, they have to have 2 cubes. There is a game that comes with the gadget, but the user can develop its own game and publish it on our website. These are the rules of our game (Called Time Machine): The story is about a few classmates who find the time machine in their school basement. They decided to travel with the machine to the era of the dinosaur. One dino started to chase them when they arrived, and they escaped and lost in the prehistoric jungle. Now the player should help them to find the Time machine.

The Rules of the Game:
1—The game starts by putting the cube in one special cell (the sensor side of the cube should locate on the board game surface).
2—Top side of the cube ask the question, what is the name of player 1, and one of the side display shows the character image and fixed name (A smartphone app can do this, and the user can also choose any desired picture or name).
3—When the first player chooses the first image or name next player tap twice on the cube, and a different name and picture appear on the other side of the cube. This process continues until all four players choose their avatars.
4—The player should tap the cube until his avatar appears on the top side of the cube.
5—Then, the player tosses the dice and counts accordingly in any direction it wants.
6—When the player settled, the top LCD shows the question, and the other four shows the 4 answers. The player should recognize the right answer and face up the correct answer side.
7—If the answer is correct, that cell will be occupied by the player, and the song or sound play in the cube and some special picture or animation.
8—All players do this until they find the Time machine.
9—Some of the cells has some gadget instead of the questions. These gadgets are
   Compas, give the time machine direction
   Drone with Camera, It can tell if the time machine is in any beside cells or not with 2 cells radius
   A supercomputer, It can get the Compas info and give 7 possible cells that the Time machine maybe exist in, or The owner Can use it for one time, answering the question
10—When the player goes to the cell that is occupied by another player, the owner of that cell get one score, and the player can choose to go to another cell
11—This game can be continued until they find the time machine, or anybody who has a better score will win.
12—The winner can collect some cryptocurrency tokens that the game has.

FIG. 1 is a perspective view of an apparatus 100 for facilitating a gameplay, in accordance with some embodiments. Accordingly, the apparatus 100 may include a game board 102 and a game piece 104.

Further, the game board 102 may include at least one playing surface 106. Further, the at least one playing surface 106 may include a plurality of markings 108-112. Further, the plurality of markings 108-112 may include a plurality of cells. Further, the plurality of cells may be characterized by a combination of at least two colors. Further, the plurality of markings 108-112 corresponds to a plurality of information associated with the gameplay. Further, the plurality of markings 108-112 uniquely corresponds to the plurality of information associated with the gameplay. Further, the plurality of information may be encoded into the plurality of markings 108-112. Further, the plurality of information may include a textual content, a visual content, an audio content, a video content, an audiovisual content, a haptic content, etc.

Figure 2:
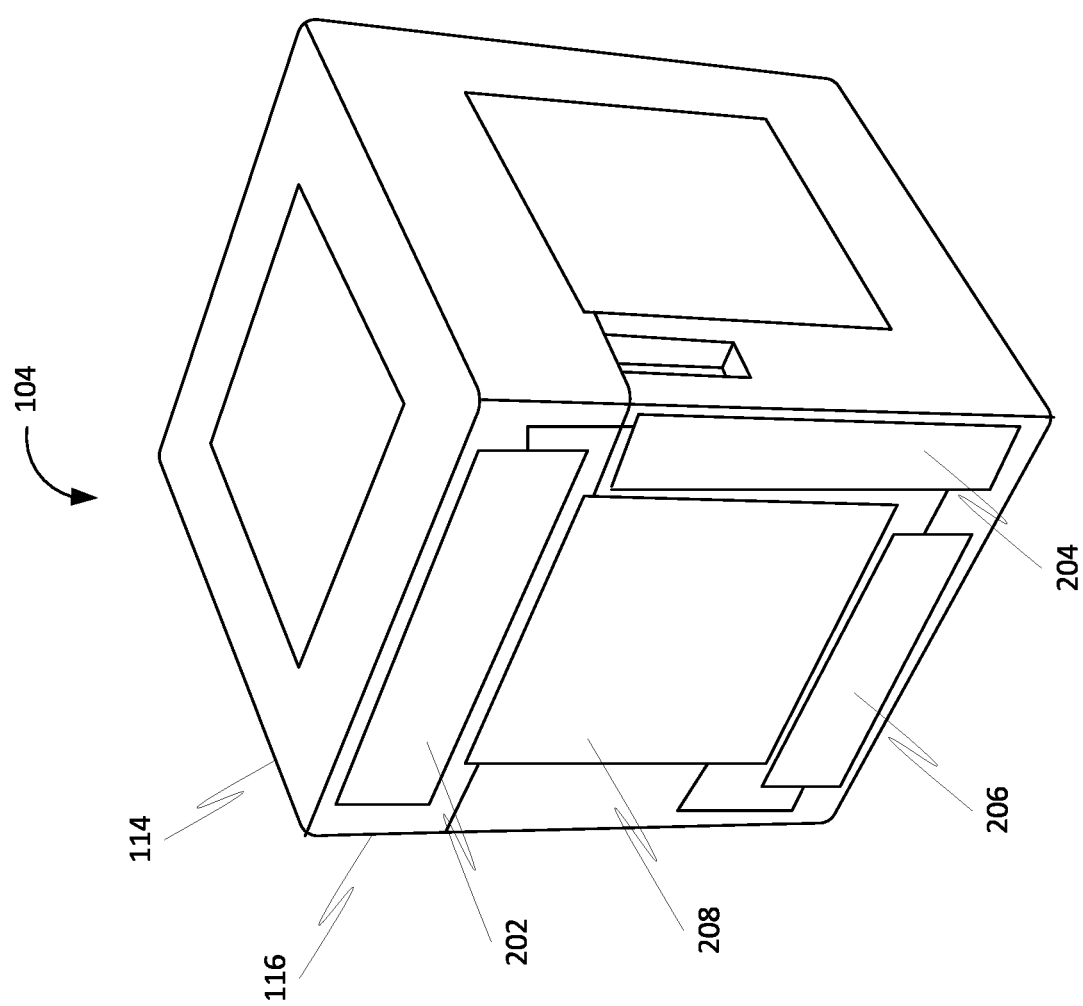
FIG. 2 is a perspective view of the game piece for facilitating the gameplay, in accordance with some embodiments.

Further, the game piece 104 may include a plurality of piece surfaces 114-116. Further, the game piece 104 may be configured to be positioned on the at least one playing surface 106. Further, one of the plurality of piece surfaces 114-116 may be disposed over one of the plurality of markings 108-112 based on the positioning of the game piece 104 on the at least one playing surface 106. Further, the game piece 104 may include at least one sensor 202, a processing device 204, a storage device 206, and at least one presentation device 208, as shown in FIG. 2. Further, the at least one sensor 202 may be configured for generating at least one sensor data based on the disposing of the one of the plurality of piece surfaces 114-116 over the one of the plurality of markings 108-112. Further, the at least one sensor 202 may be a color sensor. Further, the color sensor may be configured for detecting the combination of at least two colors. Further, the generating of the at least one sensor data may be based on the detecting of the combination of at least two colors. Further, the processing device 204 may be communicatively coupled with the at least one sensor 202. Further, the processing device 204 may be configured for analyzing the at least one sensor data. Further, the processing device 204 may be configured for identifying the one of the plurality of markings 108-112 based on the analyzing. Further, the storage device 206 may be communicatively coupled with the processing device 204. Further, the storage device 206 may be configured for retrieving one of the plurality of information corresponding to the one of the plurality of markings 108-112 based on the identifying. Further, the at least one presentation device 208 may be communicatively coupled with the storage device 206. Further, the at least one presentation device 208 may be configured for presenting the one of the plurality of information based on the retrieving. Further, the at least one presentation device 208 may include a LCD, a speaker, a vibrator, a projector, etc.

Figure 10:
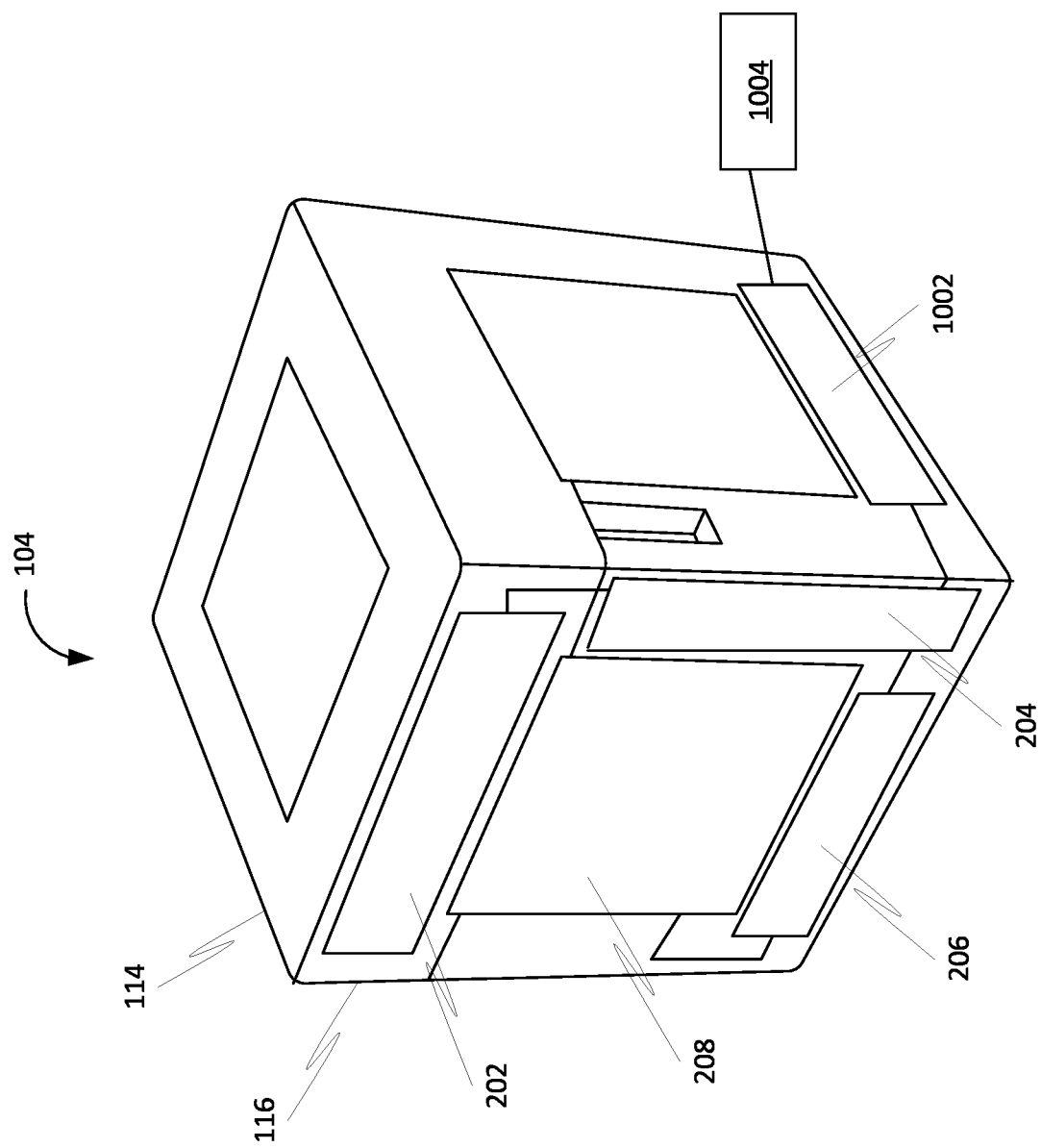
FIG. 10 is a perspective view of the game piece for facilitating the gameplay, in accordance with some embodiments.

Further, in some embodiments, the game piece 104 may be configured to be positioned on the at least one playing surface 106 by one of a plurality of players associated with the gameplay. Further, the processing device 204 may be configured for analyzing the one of the plurality of information based on the retrieving. Further, the processing device 204 may be configured for generating a number of cryptocurrency tokens for the one of the plurality of players based on the analyzing of the plurality of information. Further, the game piece 104 may include a communication device 1002, as shown in FIG. 10, communicatively coupled with the processing device 204. Further, the communication device 1002 may be configured for transmitting the number of cryptocurrency tokens to a player device 1004, as shown in FIG. 10, associated with the one of the plurality of players. Further, the plurality of players may be users. Further, the player device 1004 may include user devices.

Further, in some embodiments, the one of the plurality of piece surfaces 114-116 may be disposed over at least a portion of the one of the plurality of markings 108-112 based on the positioning of the game piece 104 on the at least one playing surface 106. Further, the generating of the at least one sensor data may be based on the disposing of the one of the plurality of piece surfaces 114-116 over at least the portion of the one of the plurality of markings 108-112. Further, the analyzing of the at least one sensor data may include analyzing the at least one sensor data using at least one machine learning model. Further, the at least one machine learning model may be trained in pattern detection. Further, the identifying of the one of the plurality of markings 108-112 may be based on the analyzing of the at least one sensor data using the at least one machine learning model.

Further, in some embodiments, the game piece 104 may be thrown on the at least one playing surface 106 by one of a plurality of players. Further, the positioning of the game piece 104 on the at least one playing surface 106 may be further based on the throwing. Further, the at least one sensor 202 may be further configured for generating at least one first sensor data based on the throwing. Further, the processing device 204 may be configured for analyzing the at least one first sensor data. Further, the processing device 204 may be configured for determining a current throw action of the one of the plurality of players based on the analyzing of the at least one first sensor data. Further, the processing device 204 may be configured for analyzing the current throw action and at least one previous throw action of the one of the plurality of players using at least one first machine learning model. Further, the at least one first machine learning model may be trained in pattern detection. Further, the processing device 204 may be configured for determining a degree of similarity between the current throw action and the at least one previous throw action based on the analyzing of the current throw action and the at least one previous throw action. Further, the processing device 204 may be configured for determining a fairness of the throwing based on the determining of the degree of similarity. Further, repetition of a throw action by the plurality of player may be considered as unfair. Further, the processing device 204 may be configured for generating a notification of the fairness of the throwing based on the determining of the fairness. Further, the storage device 206 may be further configured for retrieving the at least one previous throw action of the one of the plurality of players. Further, the at least one presentation device 208 may be further configured for presenting the notification.

Figure 3:
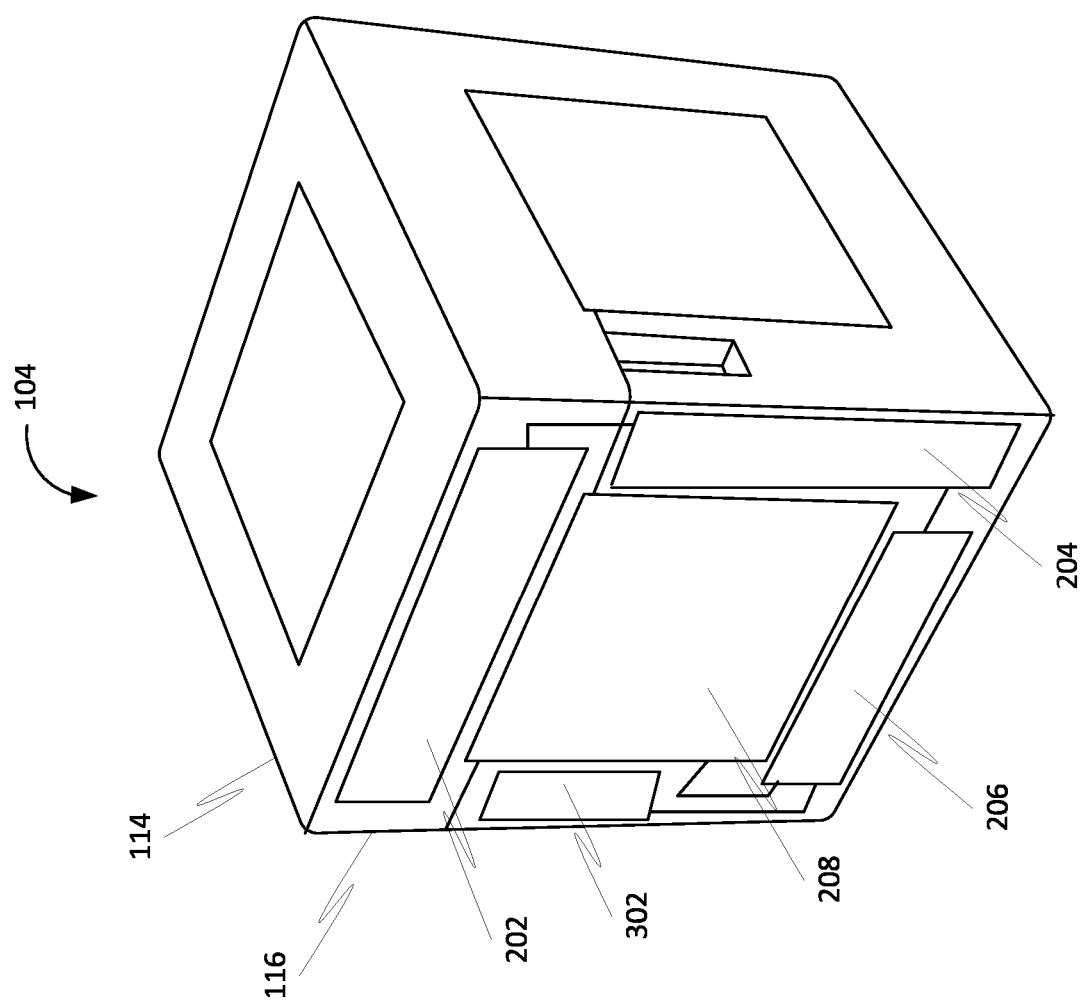
FIG. 3 is a perspective view of the game piece for facilitating the gameplay, in accordance with some embodiments.

In further embodiments, the game piece 104 may include at least one communication interface 302, as shown in FIG. 3, communicatively coupled with the storage device 206. Further, the at least one communication interface 302 may be configured for receiving the plurality of information associated corresponding to the plurality of markings 108-112 from at least one user device. Further, the storage device 206 may be further configured for storing the plurality of information. Further, the retrieving of the one of the plurality of information may be further based on the storing of the plurality of information.

Further, in some embodiments, the plurality of piece surfaces 114-116 corresponds to a plurality of piece information. Further, the plurality of piece information may include a textual content, a visual content, an audio content, a video content, an audiovisual content, a haptic content, etc. Further, the at least one sensor 202 further may include a gyroscopic sensor 402. Further, the gyroscopic sensor 402 may be configured for generating at least one orientation data based on detecting an orientation of the game piece 104 in relation to the at least one playing surface 106 based on the disposing of the one of the plurality of piece surfaces 114-116 over the one of the plurality of markings 108-112. Further, the at least one sensor data may include the at least one orientation data. Further, the analyzing of the at least one sensor data may include analyzing the at least one orientation data. Further, the processing device 204 may be further configured for identifying the one of the plurality of piece surfaces 114-116 from the plurality of piece surfaces 114-116 based on the analyzing of the at least one orientation data. Further, the storage device 206 may be further configured for retrieving one of the plurality of piece information corresponding to the one of the plurality of piece surfaces 114-116 based the identifying of the one of the plurality of piece surfaces 114-116. Further, the at least one presentation device 208 may be further configured for presenting the one of the plurality of piece information.

Figure 5:
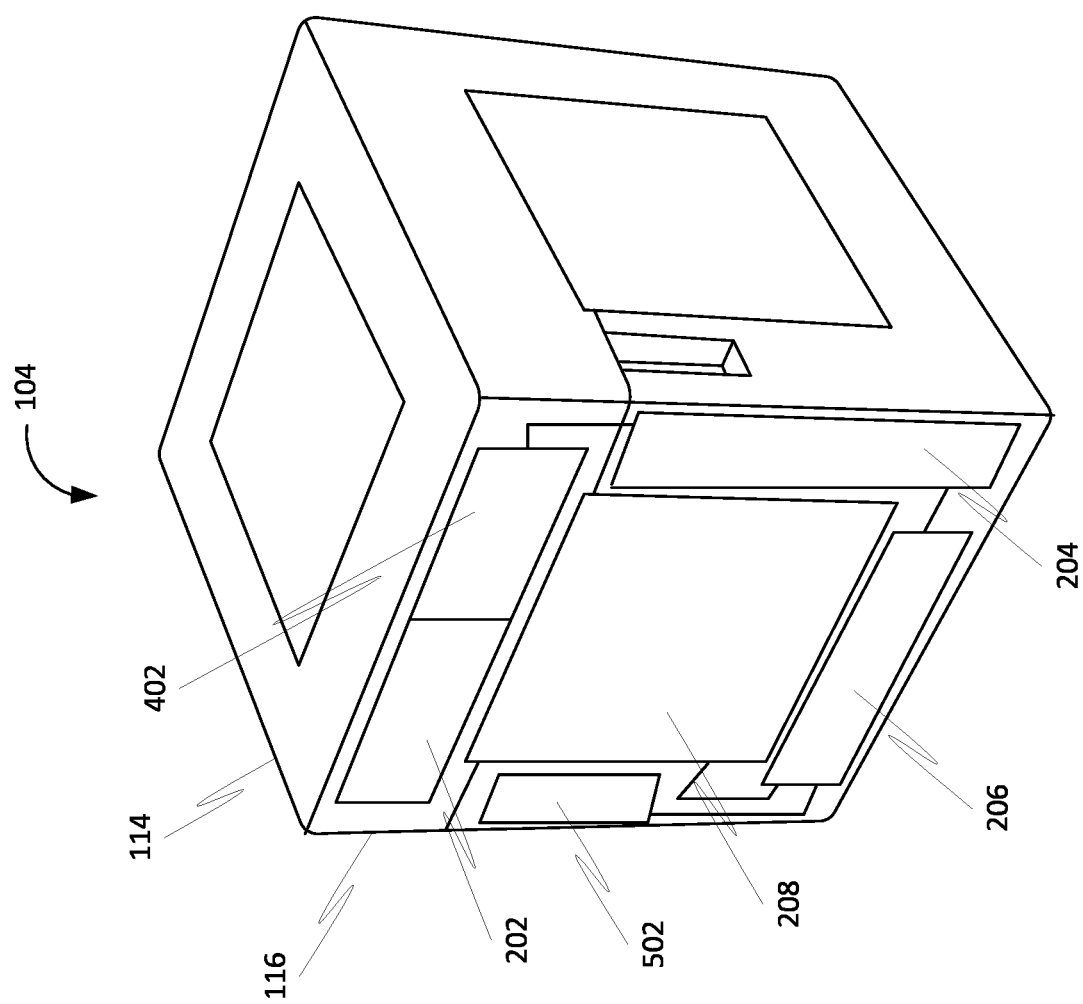
FIG. 5 is a perspective view of the game piece for facilitating the gameplay, in accordance with some embodiments.

Further, in some embodiments, the game piece 104 may include at least one communication interface 502, as shown in FIG. 5, communicatively coupled with the storage device 206. Further, the at least one communication interface 502 may include a port, a radio communication module, etc. Further, the port may include at least one USB port. Further, the radio communication module may include WiFi, Bluetooth, infrared, etc. Further, the at least one communication interface 502 may be configured for receiving the plurality of piece information associated corresponding to the plurality of piece surfaces 114-116 from at least one user device. Further, the storage device 206 may be configured for storing the plurality of piece information. Further, the retrieving of the one of the plurality of piece information may be further based on the storing of the plurality of piece information.

Figure 6:
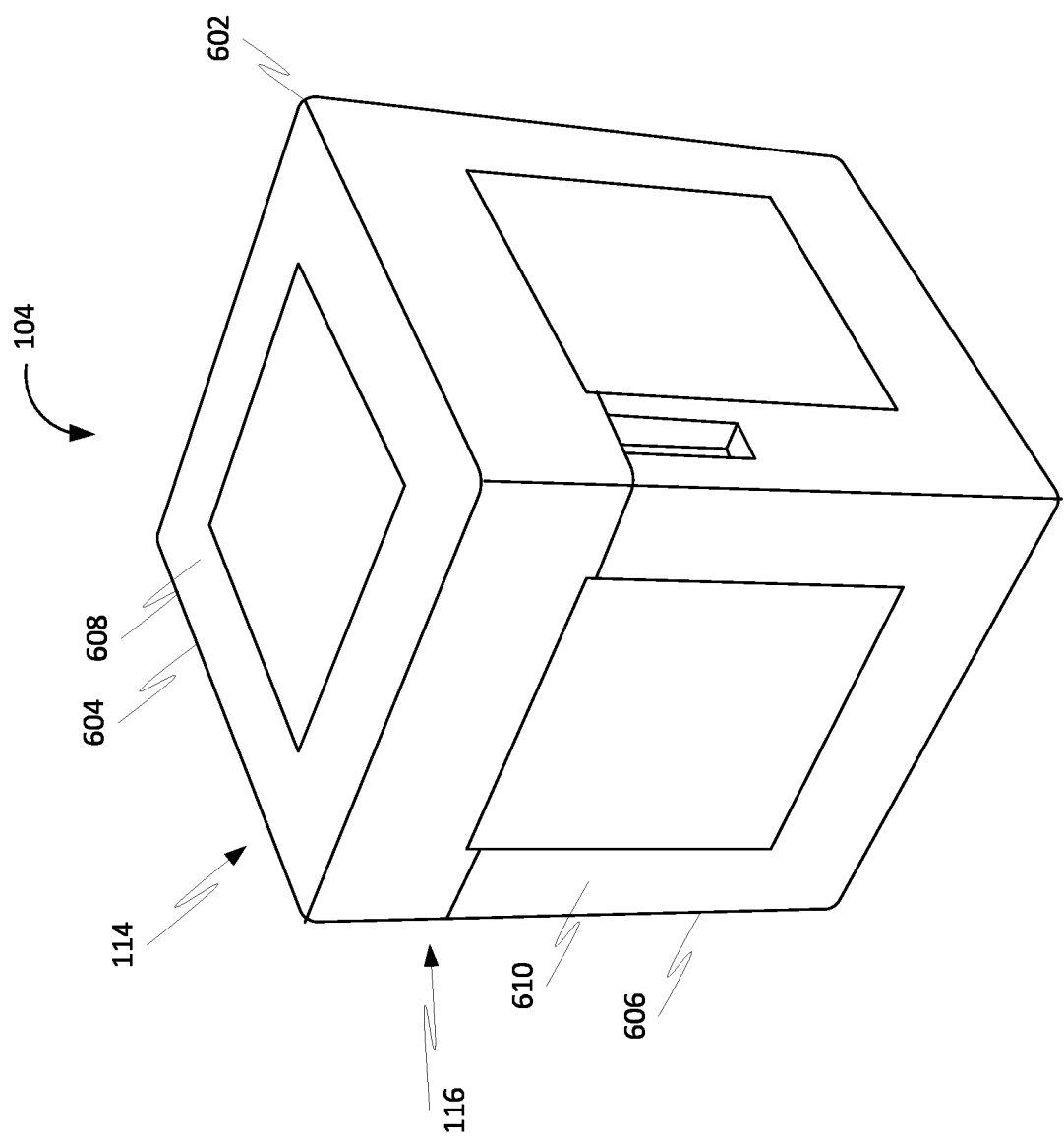
FIG. 6 is a perspective view of the game piece for facilitating the gameplay, in accordance with some embodiments.

Further, in some embodiments, the game piece 104 may include at least one three-dimensional object 602, as shown in FIG. 6. Further, the at least one three-dimensional object 602 may include a dice. Further, the dice may be a polyhedral dice, a cube dice, a spherical dice, etc. Further, the at least one three-dimensional object 602 may include a plurality of panels 604-606, as shown in FIG. 6. Further, the plurality of panels 604-606 may be arranged in at least one configuration for forming one of the at least one three-dimensional object 602. Further, a plurality of external surfaces 608-610, as shown in FIG. 6, of the plurality of panels 604-606 forms the plurality of piece surfaces 114-116.

Figure 7:
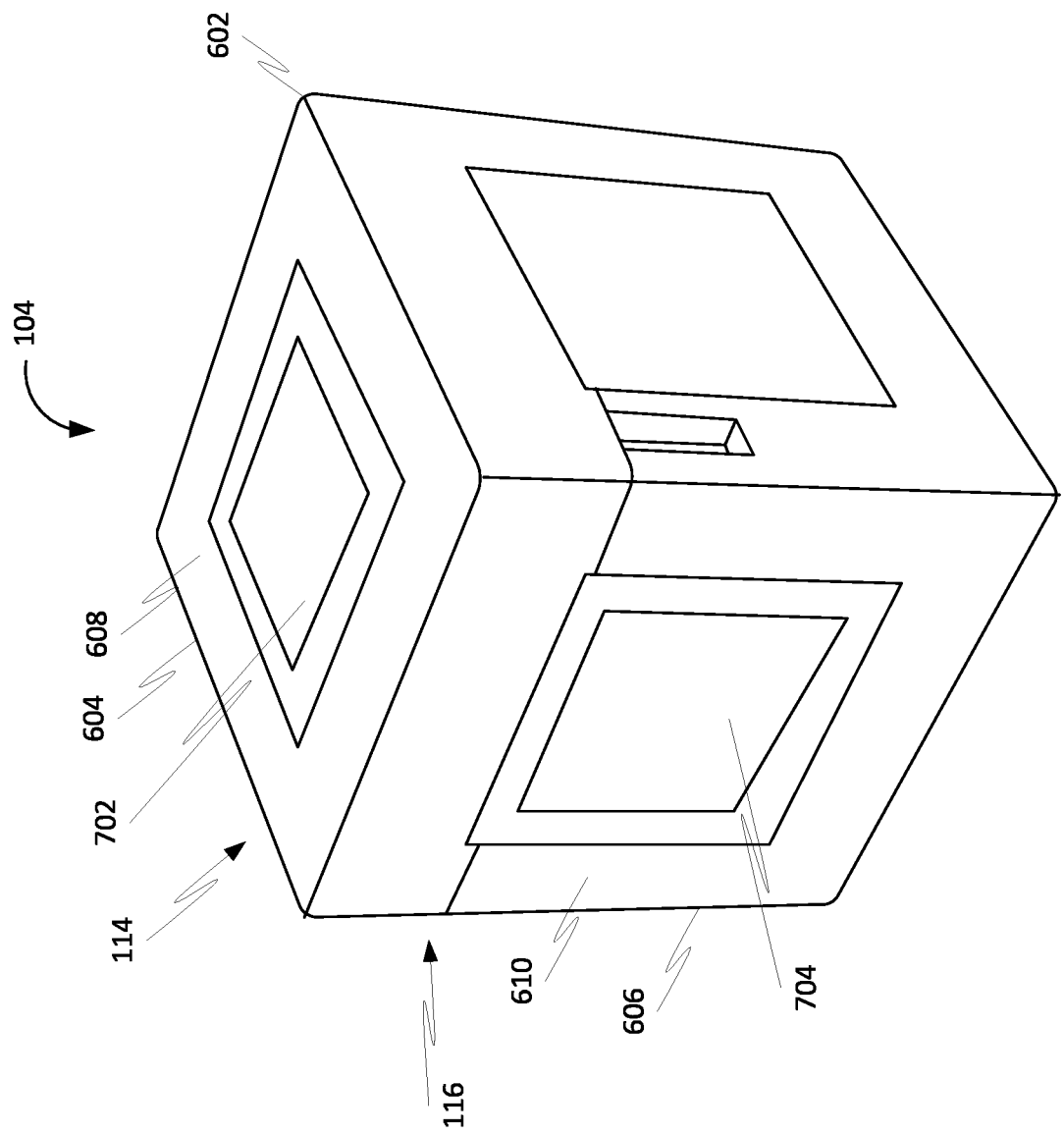
FIG. 7 is a perspective view of the game piece for facilitating the gameplay, in accordance with some embodiments.

Further, in an embodiment, the at least one presentation device 208 further may include a plurality of display devices 702-704, as shown in FIG. 7, corresponding to the plurality of piece surfaces 114-116. Further, the plurality of display devices 702-704 may be comprised in the plurality of external surfaces 608-610 of the plurality of panels 604-606. Further, the plurality of display devices 702-704 may include LCDs, projectors, etc.

Figure 8:
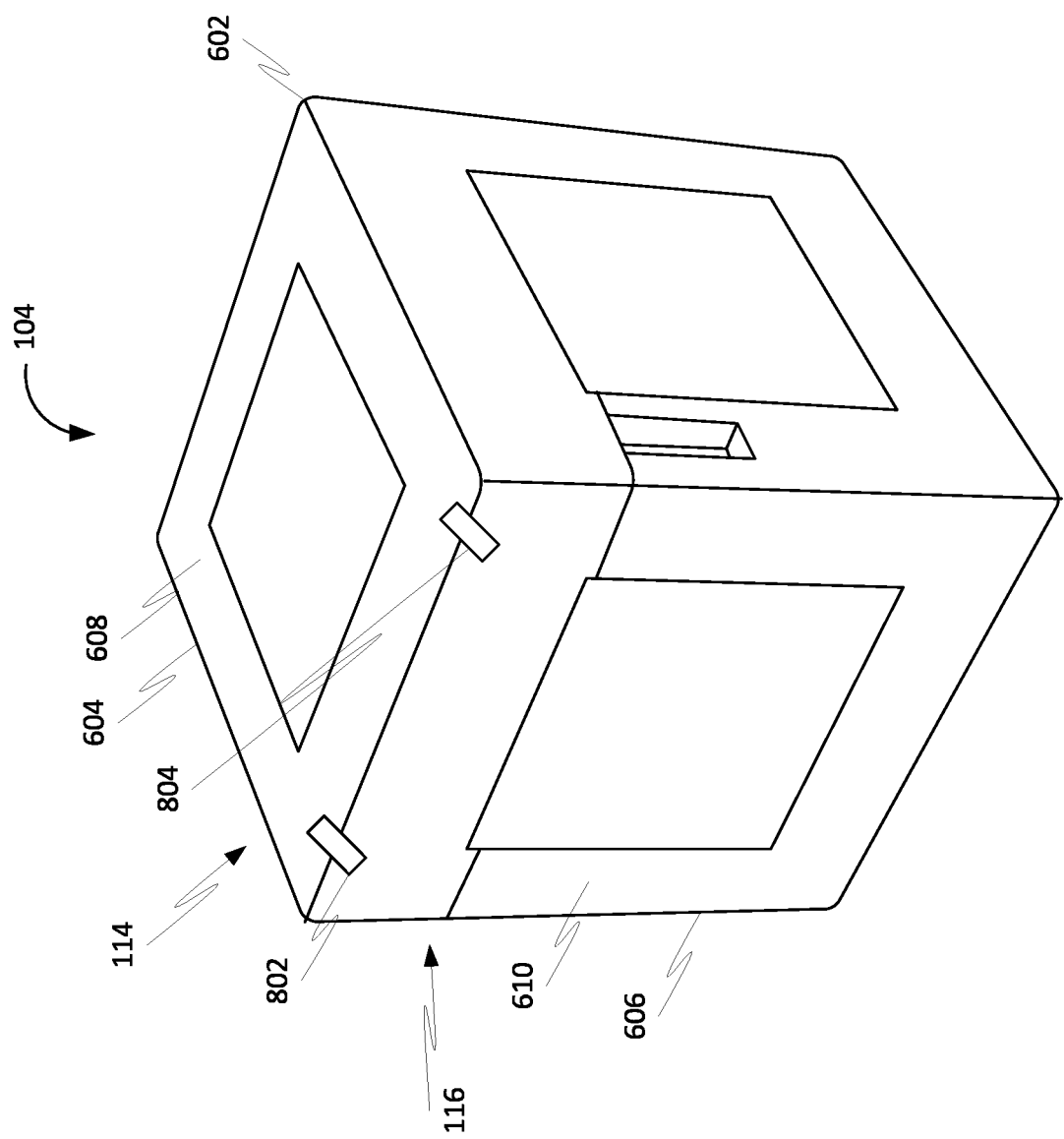
FIG. 8 is a perspective view of the game piece for facilitating the gameplay, in accordance with some embodiments.

Further, in an embodiment, the plurality of panels 604-606 may be configured to be connected in the at least one configuration using at least one connector 802-804, as shown in FIG. 8, for the forming of the one of the at least one three-dimensional object 602. Further, the at least one connector 802-804 may include at least one fastener. Further, the at least one fastener may be configured for attaching the one of the plurality of panels 604-606 to at least one of the plurality of panels 604-606. Further, the forming of the one of the at least one three-dimensional object 602 may be further based on the attaching.

Figure 9:
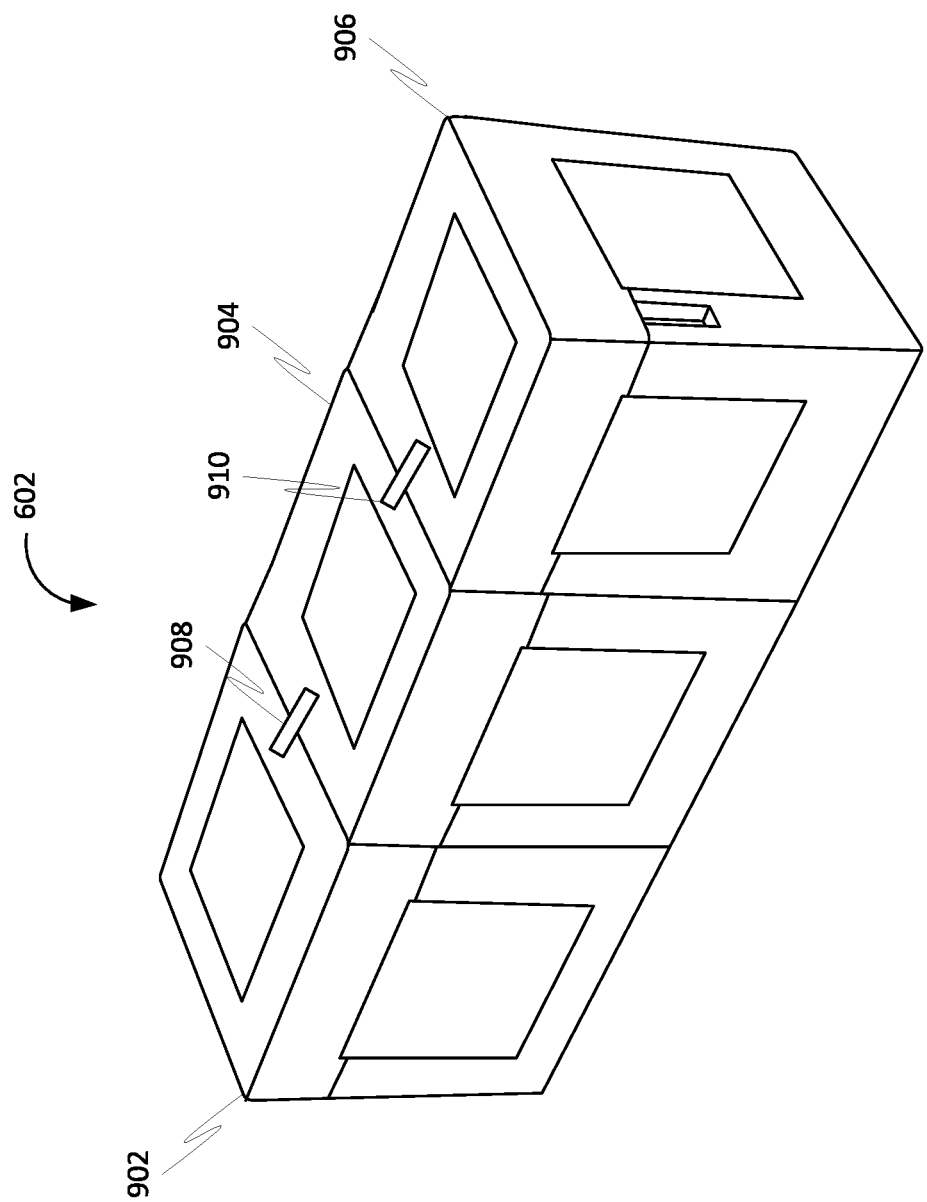
FIG. 9 is a perspective view of the plurality of three-dimensional objects of the game piece for facilitating the gameplay, in accordance with some embodiments.

Further, in an embodiment, the at least one three-dimensional object 602 may include a plurality of three-dimensional objects 902-906, as shown in FIG. 9. Further, one of the plurality of three-dimensional objects 902-906 may be configured to be attached to at least one of the plurality of three-dimensional objects 902-906 in at least one object configuration using at least one object connector 908-910, as shown in FIG. 9, for forming the game piece 104.

FIG. 2 is a perspective view of the game piece 104 for facilitating the gameplay, in accordance with some embodiments.

FIG. 3 is a perspective view of the game piece 104 for facilitating the gameplay, in accordance with some embodiments.

Figure 4:
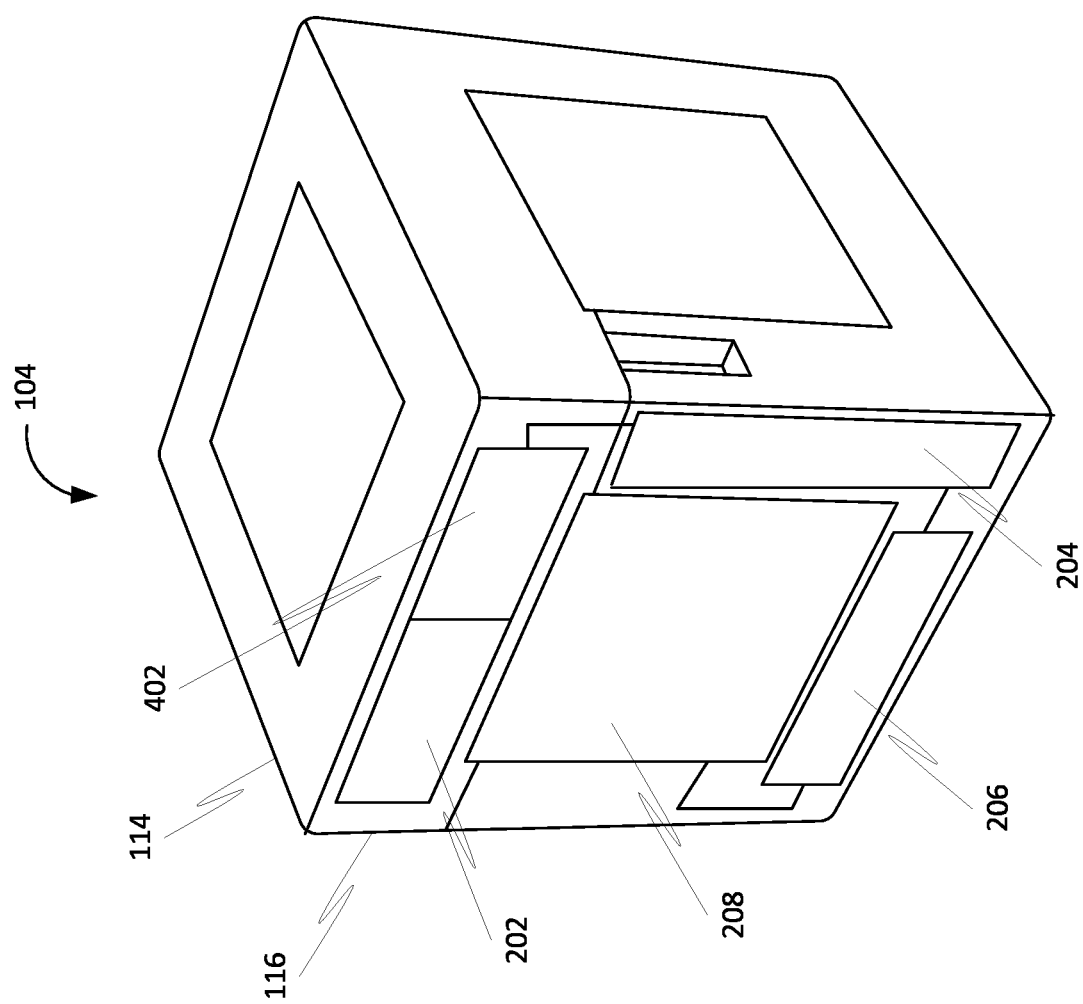
FIG. 4 is a perspective view of the game piece for facilitating the gameplay, in accordance with some embodiments.

FIG. 4 is a perspective view of the game piece 104 for facilitating the gameplay, in accordance with some embodiments.

FIG. 5 is a perspective view of the game piece 104 for facilitating the gameplay, in accordance with some embodiments.

FIG. 6 is a perspective view of the game piece 104 for facilitating the gameplay, in accordance with some embodiments.

FIG. 7 is a perspective view of the game piece 104 for facilitating the gameplay, in accordance with some embodiments.

FIG. 8 is a perspective view of the game piece 104 for facilitating the gameplay, in accordance with some embodiments.

FIG. 9 is a perspective view of the plurality of three-dimensional objects 902-906 of the game piece 104 for facilitating the gameplay, in accordance with some embodiments.

FIG. 10 is a perspective view of the game piece 104 for facilitating the gameplay, in accordance with some embodiments.

Figure 11:
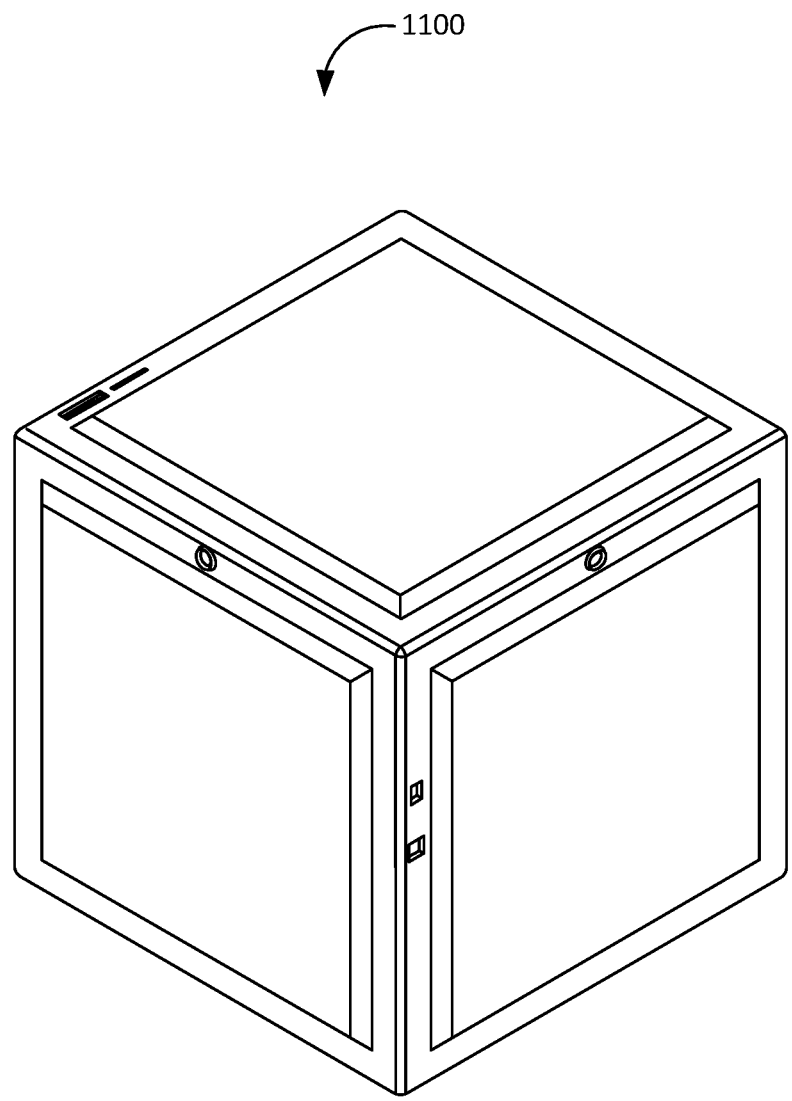
FIG. 11 is a perspective view of a game piece for facilitating a gameplay, in accordance with some embodiments.

FIG. 11 is a perspective view of a game piece 1100 for facilitating a gameplay, in accordance with some embodiments.

Figure 12:
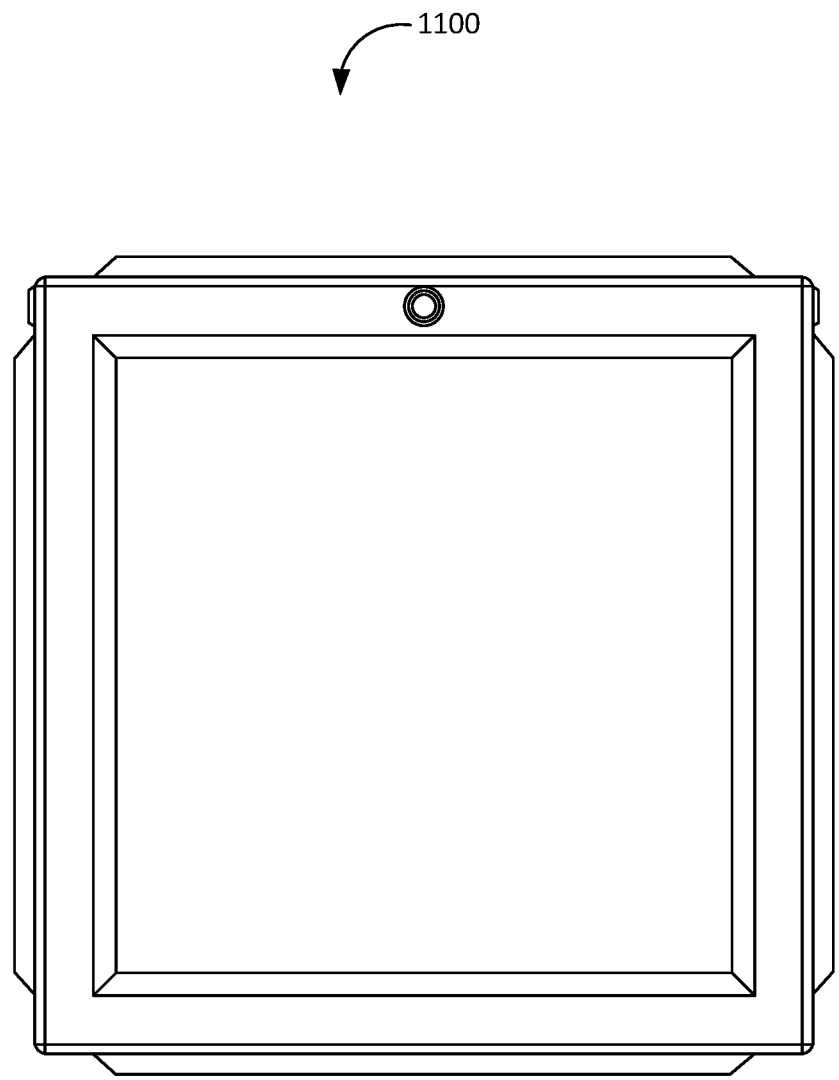
FIG. 12 is a front view of the game piece for facilitating the gameplay, in accordance with some embodiments.

FIG. 12 is a front view of the game piece 1100 for facilitating the gameplay, in accordance with some embodiments.

Figure 13:
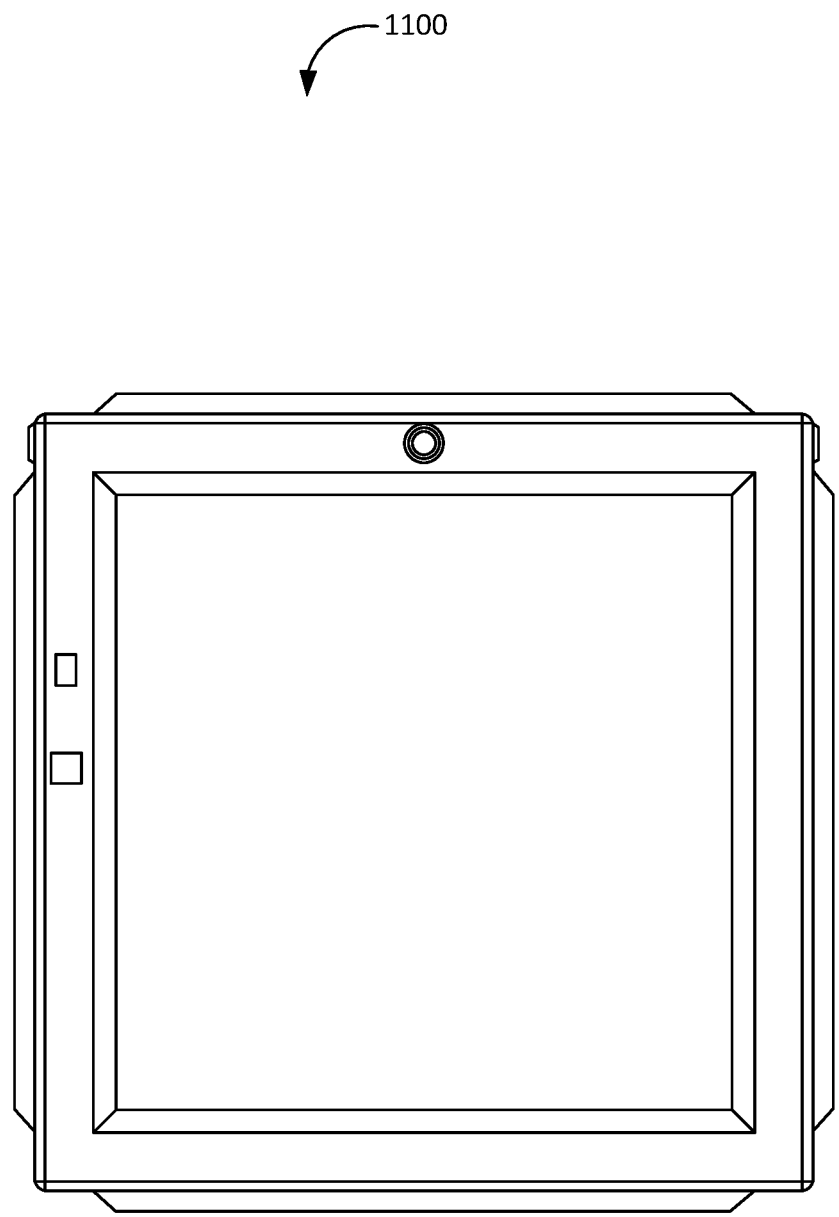
FIG. 13 is a right view of the game piece for facilitating the gameplay, in accordance with some embodiments.

FIG. 13 is a right view of the game piece 1100 for facilitating the gameplay, in accordance with some embodiments.

Figure 14:
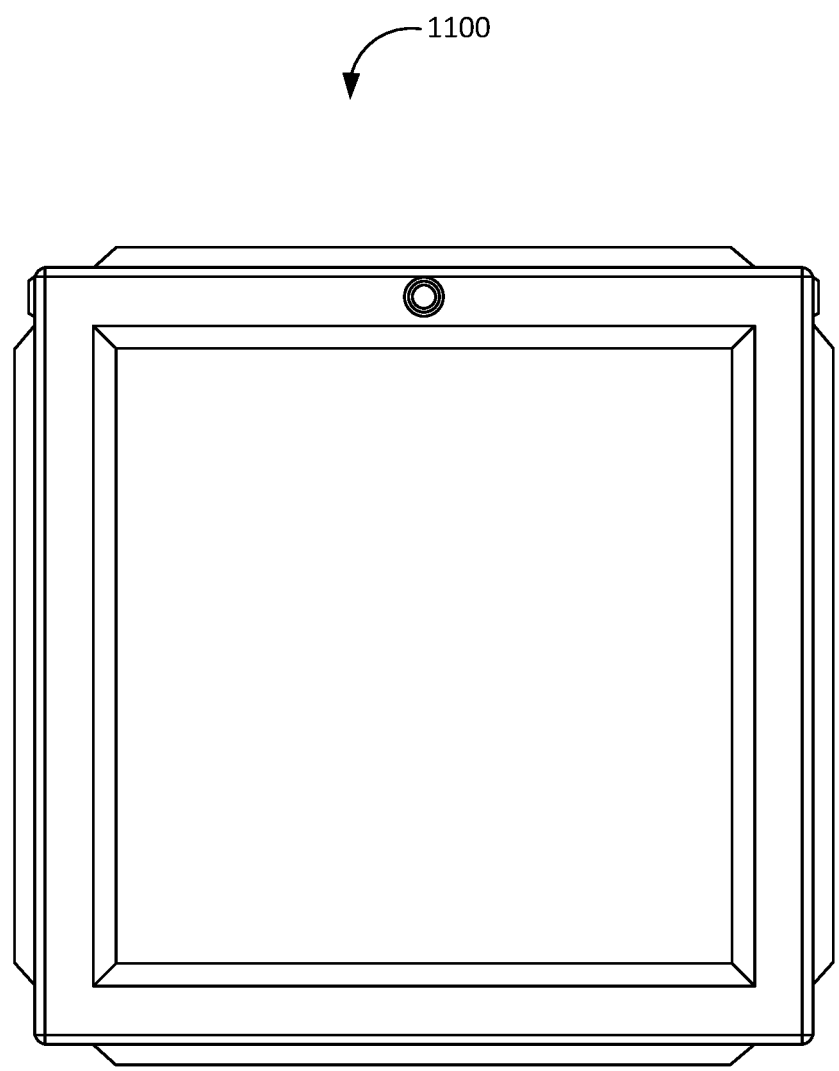
FIG. 14 is a left view of the game piece for facilitating the gameplay, in accordance with some embodiments.

FIG. 14 is a left view of the game piece 1100 for facilitating the gameplay, in accordance with some embodiments.

Figure 15:
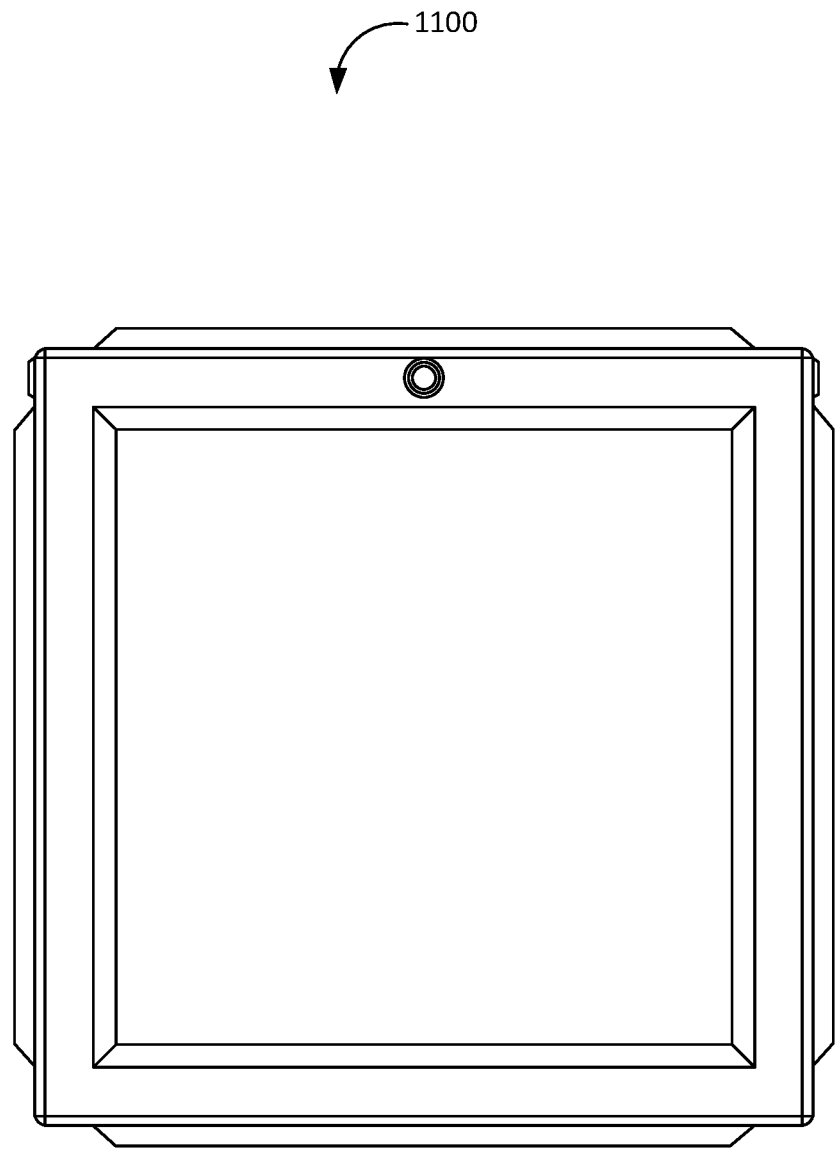
FIG. 15 is a rear view of the game piece for facilitating the gameplay, in accordance with some embodiments.

FIG. 15 is a rear view of the game piece 1100 for facilitating the gameplay, in accordance with some embodiments.

Figure 16:
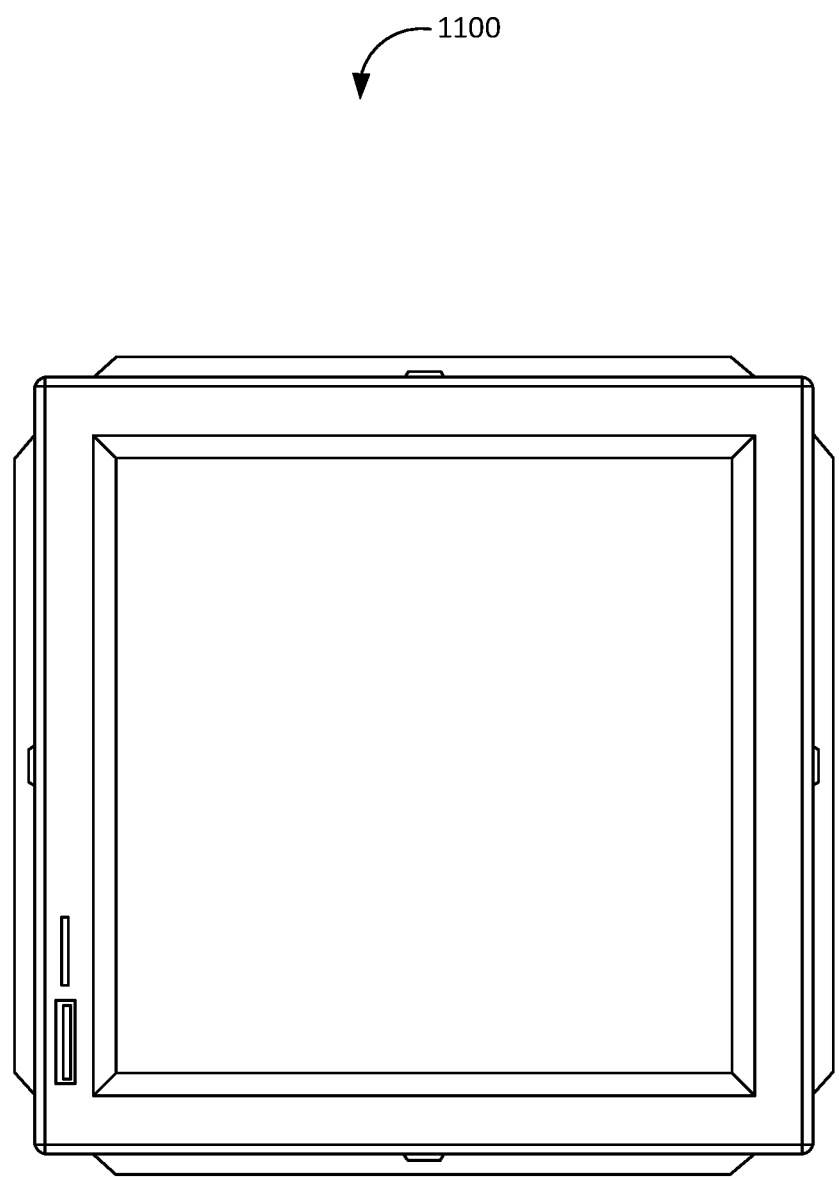
FIG. 16 is a top view of the game piece for facilitating the gameplay, in accordance with some embodiments
Figure 17:
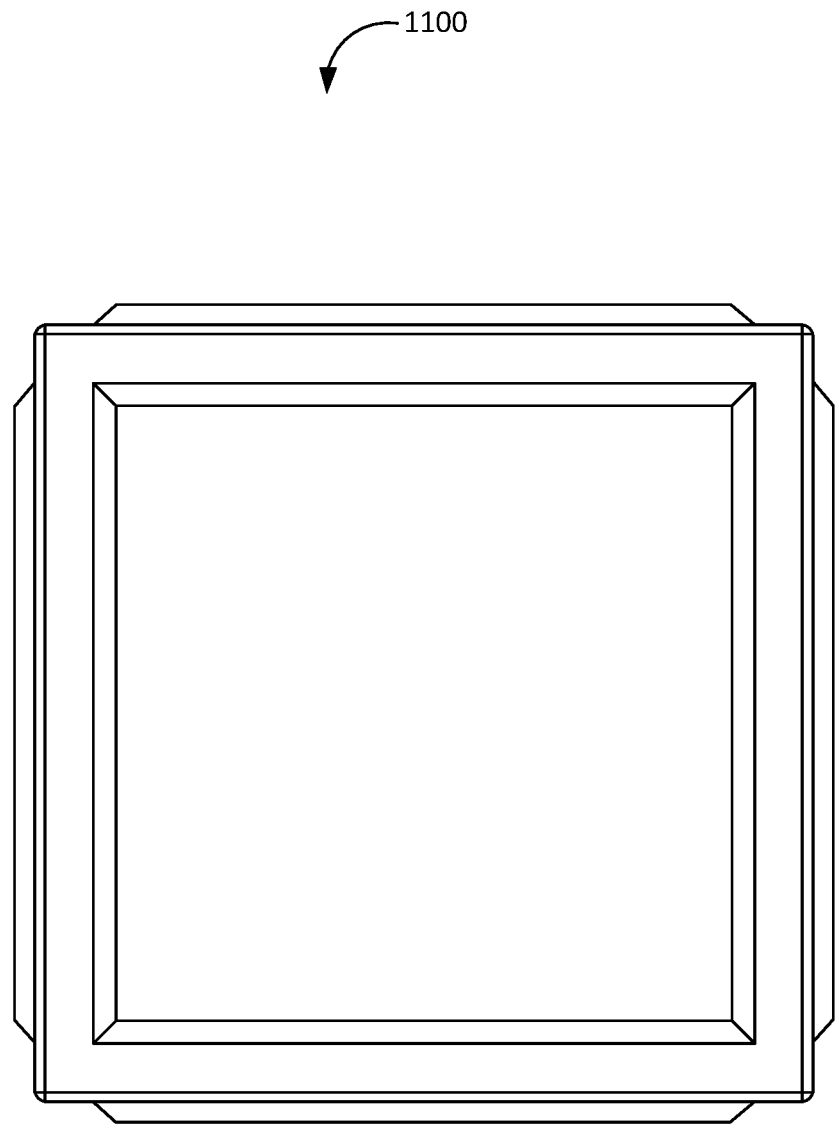
FIG. 17 is a bottom view of the game piece for facilitating the gameplay, in accordance with some embodiments.

FIG. 16 is a top view of the game piece 1100 for facilitating the gameplay, in accordance with some embodiments FIG. 17 is a bottom view of the game piece 1100 for facilitating the gameplay, in accordance with some embodiments.

Figure 18:
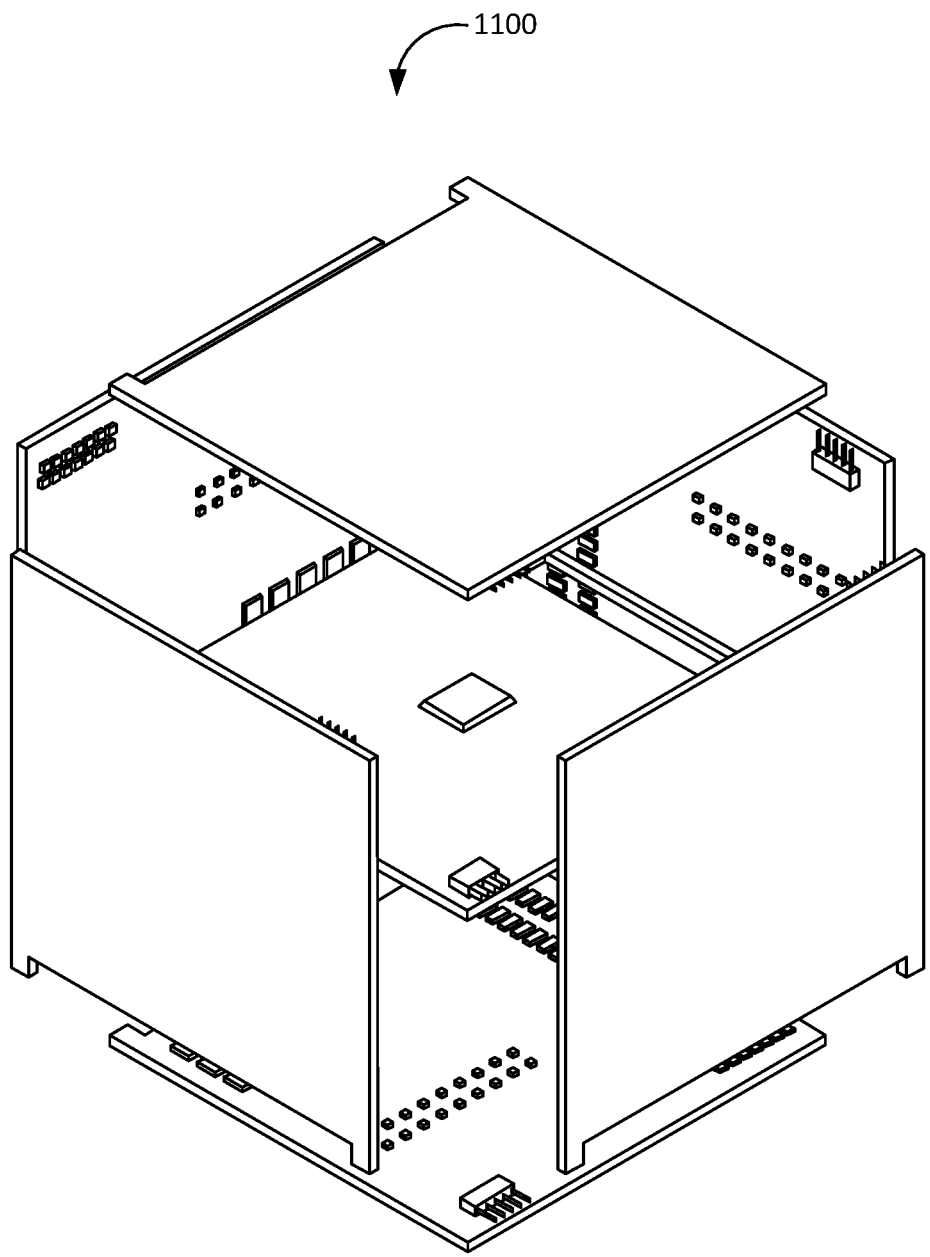
FIG. 18 is an exploded view of the game piece for facilitating the gameplay, in accordance with some embodiments.

FIG. 18 is an exploded view of the game piece 1100 for facilitating the gameplay, in accordance with some embodiments.

Figure 19:
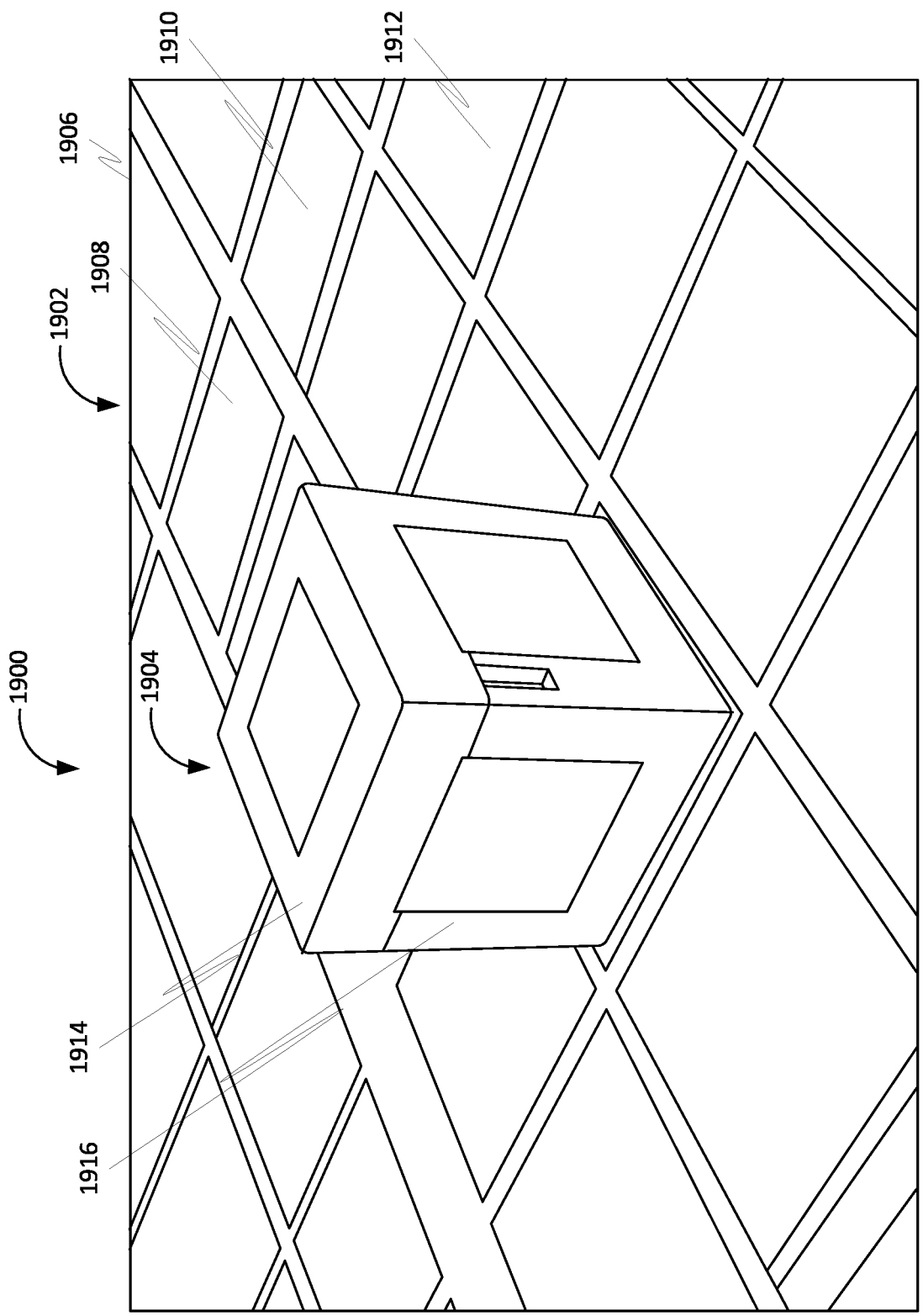
FIG. 19 is a perspective view of an apparatus for facilitating a gameplay, in accordance with some embodiments.

FIG. 19 is a perspective view of an apparatus 1900 for facilitating a gameplay, in accordance with some embodiments. Accordingly, the apparatus 1900 may include a game board 1902 and a game piece 1904.

Further, the game board 1902 may include at least one playing surface 1906. Further, the at least one playing surface 1906 may include a plurality of markings 1908-1912. Further, the plurality of markings 1908-1912 corresponds to a plurality of information associated with the gameplay.

Further, the game piece 1904 may include a plurality of piece surfaces 1914-1916. Further, the game piece 1904 may be configured to be positioned on the at least one playing surface 1906. Further, one of the plurality of piece surfaces 1914-1916 may be disposed over one of the plurality of markings 1908-1912 based on the positioning of the game piece 1904 on the at least one playing surface 1906. Further, the game piece 1904 may include at least one three-dimensional object 2102. Further, the at least one three-dimensional object 2102 may include a plurality of panels 2104-2106. Further, the plurality of panels 2104-2106 may be arranged in at least one configuration for forming one of the at least one three-dimensional object 2102. Further, a plurality of external surfaces 2108-2110 of the plurality of panels 2104-2106 forms the plurality of piece surfaces 1914-1916. Further, the game piece 1904 may include at least one sensor 2002, a processing device 2004, a storage device 2006, and at least one presentation device 2008. Further, the at least one sensor 2002 may be configured for generating at least one sensor data based on the disposing of the one of the plurality of piece surfaces 1914-1916 over the one of the plurality of markings 1908-1912. Further, the processing device 2004 may be communicatively coupled with the at least one sensor 2002. Further, the processing device 2004 may be configured for analyzing the at least one sensor data. Further, the processing device 2004 may be configured for identifying the one of the plurality of markings 1908-1912 based on the analyzing. Further, the storage device 2006 may be communicatively coupled with the processing device 2004. Further, the storage device 2006 may be configured for retrieving one of the plurality of information corresponding to the one of the plurality of markings 1908-1912 based on the identifying. Further, the at least one presentation device 2008 may be communicatively coupled with the storage device 2006. Further, the at least one presentation device 2008 may be configured for presenting the one of the plurality of information based on the retrieving.

Further, in some embodiments, the game piece 1904 may be configured to be positioned on the at least one playing surface 1906 by one of a plurality of players associated with the gameplay. Further, the processing device 2004 may be configured for analyzing the one of the plurality of information based on the retrieving. Further, the processing device 2004 may be configured for generating a number of cryptocurrency tokens for the one of the plurality of players based on the analyzing of the plurality of information. Further, the game piece 1904 may include a communication device communicatively coupled with the processing device 2004. Further, the communication device may be configured for transmitting the number of cryptocurrency tokens to a player device associated with the one of the plurality of players.

Further, in some embodiments, the one of the plurality of piece surfaces 1914-1916 may be disposed over at least a portion of the one of the plurality of markings 1908-1912 based on the positioning of the game piece 1904 on the at least one playing surface 1906. Further, the generating of the at least one sensor data may be based on the disposing of the one of the plurality of piece surfaces 1914-1916 over at least the portion of the one of the plurality of markings 1908-1912. Further, the analyzing of the at least one sensor data may include analyzing the at least one sensor data using at least one machine learning model. Further, the at least one machine learning model may be trained in pattern detection. Further, the identifying of the one of the plurality of markings 1908-1912 may be based on the analyzing of the at least one sensor data using the at least one machine learning model.

Further, in some embodiments, the game piece 1904 may be thrown on the at least one playing surface 1906 by one of a plurality of players. Further, the positioning of the game piece 1904 on the at least one playing surface 1906 may be further based on the throwing. Further, the at least one sensor 2002 may be further configured for generating at least one first sensor data based on the throwing. Further, the processing device 2004 may be configured for analyzing the at least one first sensor data. Further, the processing device 2004 may be configured for determining a current throw action of the one of the plurality of players based on the analyzing of the at least one first sensor data. Further, the processing device 2004 may be configured for analyzing the current throw action and at least one previous throw action of the one of the plurality of players using at least one first machine learning model. Further, the at least one first machine learning model may be trained in pattern detection. Further, the processing device 2004 may be configured for determining a degree of similarity between the current throw action and the at least one previous throw action based on the analyzing of the current throw action and the at least one previous throw action. Further, the processing device 2004 may be configured for determining a fairness of the throwing based on the determining of the degree of similarity. Further, the processing device 2004 may be configured for generating a notification of the fairness of the throwing based on the determining of the fairness. Further, the storage device 2006 may be further configured for retrieving the at least one previous throw action of the one of the plurality of players. Further, the at least one presentation device 2008 may be further configured for presenting the notification.

In further embodiments, the game piece 1904 may include at least one communication interface communicatively coupled with the storage device 2006. Further, the at least one communication interface may be configured for receiving the plurality of information associated corresponding to the plurality of markings 1908-1912 from at least one user device. Further, the storage device 2006 may be further configured for storing the plurality of information. Further, the retrieving of the one of the plurality of information may be further based on the storing of the plurality of information.

Further, in some embodiments, the plurality of piece surfaces 1914-1916 corresponds to a plurality of piece information. Further, the at least one sensor 2002 further may include a gyroscopic sensor. Further, the gyroscopic sensor may be configured for generating at least one orientation data based on detecting an orientation of the game piece 1904 in relation to the at least one playing surface 1906 based on the disposing of the one of the plurality of piece surfaces 1914-1916 over the one of the plurality of markings 1908-1912. Further, the at least one sensor data may include the at least one orientation data. Further, the analyzing of the at least one sensor data may include analyzing the at least one orientation data. Further, the processing device 2004 may be further configured for identifying the one of the plurality of piece surfaces 1914-1916 from the plurality of piece surfaces 1914-1916 based on the analyzing of the at least one orientation data. Further, the storage device 2006 may be further configured for retrieving one of the plurality of piece information corresponding to the one of the plurality of piece surfaces 1914-1916 based the identifying of the one of the plurality of piece surfaces 1914-1916. Further, the at least one presentation device 2008 may be further configured for presenting the one of the plurality of piece information.

Further, in some embodiments, the game piece 1904 may include at least one communication interface communicatively coupled with the storage device 2006. Further, the at least one communication interface may be configured for receiving the plurality of piece information associated corresponding to the plurality of piece surfaces 1914-1916 from at least one user device. Further, the storage device 2006 may be configured for storing the plurality of piece information. Further, the retrieving of the one of the plurality of piece information may be further based on the storing of the plurality of piece information.

Further, in some embodiments, the at least one presentation device 2008 further may include a plurality of display devices corresponding to the plurality of piece surfaces 1914-1916. Further, the plurality of display devices may be comprised in the plurality of external surfaces 2108-2110 of the plurality of panels 2104-2106.

Further, in some embodiments, the plurality of panels 2104-2106 may be configured to be connected in the at least one configuration using at least one connector for the forming of the one of the at least one three-dimensional object 2102. Further, the at least one connector may include at least one fastener. Further, the at least one fastener may be configured for attaching the one of the plurality of panels 2104-2106 to at least one of the plurality of panels 2104-2106. Further, the forming of the one of the at least one three-dimensional object 2102 may be further based on the attaching.

Further, in some embodiments, the at least one three-dimensional object 2102 may include a plurality of three-dimensional objects. Further, one of the plurality of three-dimensional objects may be configured to be attached to at least one of the plurality of three-dimensional objects in at least one object configuration using at least one object connector for forming the game piece 1904.

Figure 20:
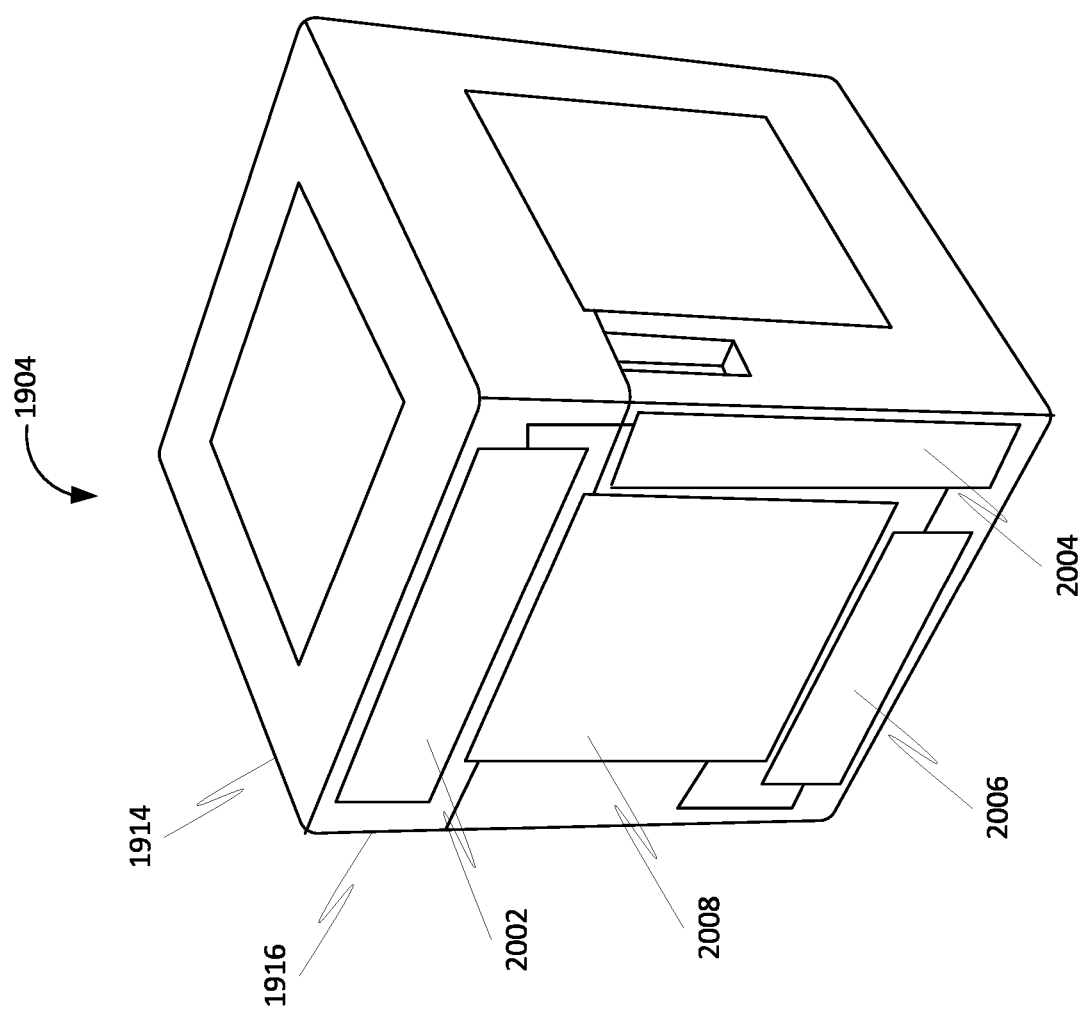
FIG. 20 is a perspective view of the game piece for facilitating the gameplay, in accordance with some embodiments.

FIG. 20 is a perspective view of the game piece 1904 for facilitating the gameplay, in accordance with some embodiments.

Figure 21:
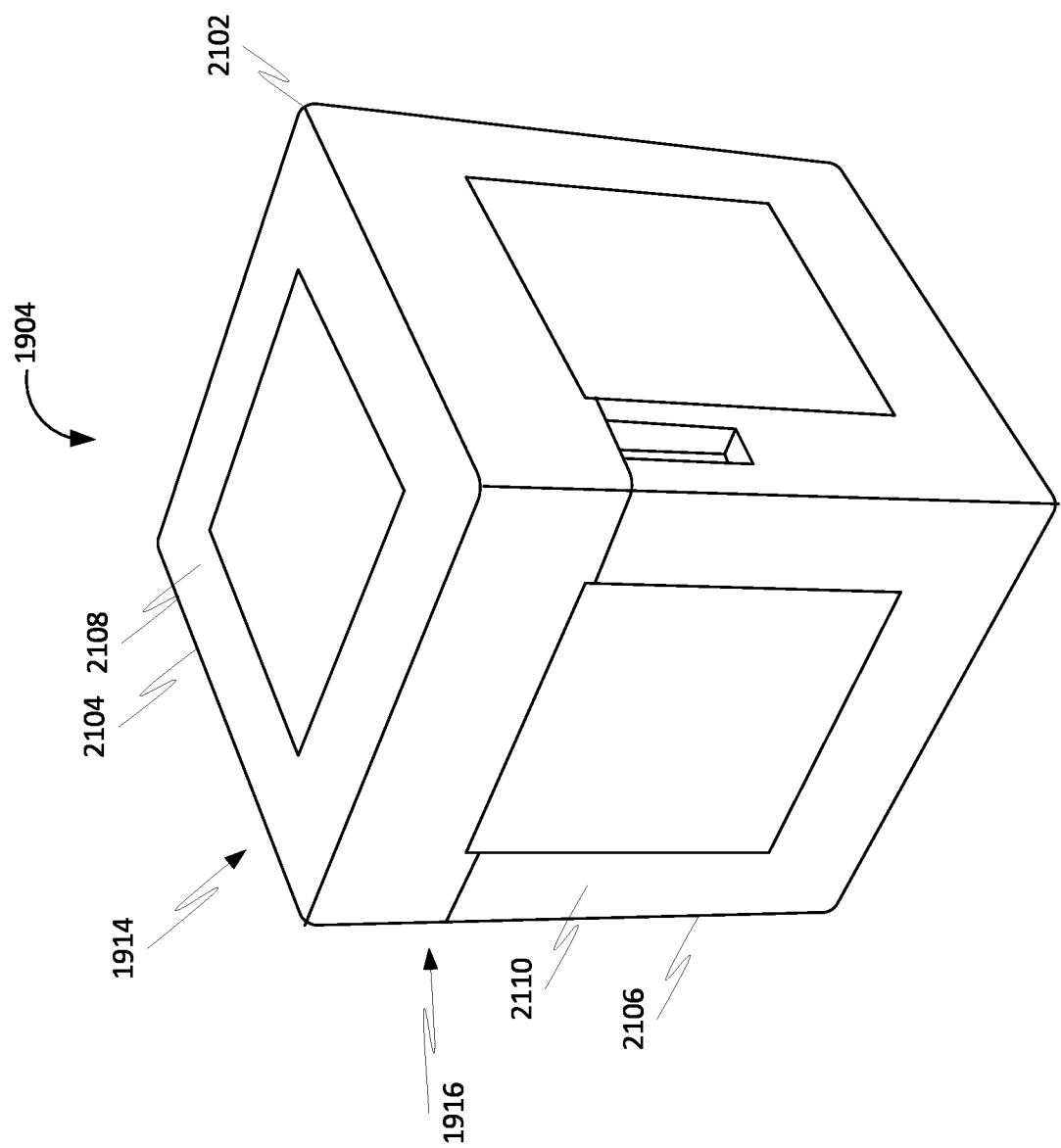
FIG. 21 is a perspective view of the game piece for facilitating the gameplay, in accordance with some embodiments

FIG. 21 is a perspective view of the game piece 1904 for facilitating the gameplay, in accordance with some embodiments.

Figure 22:
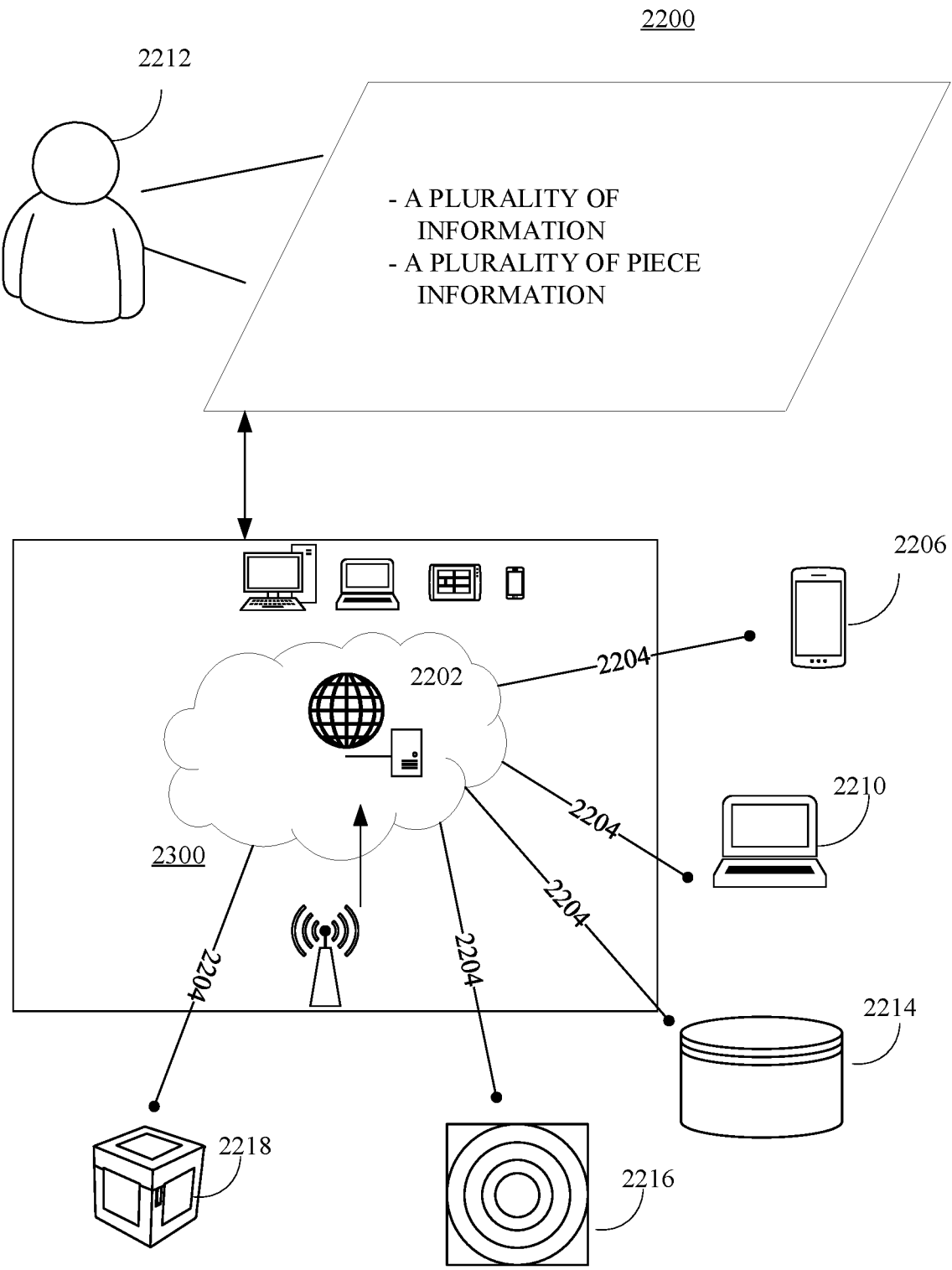
FIG. 22 is an illustration of an online platform consistent with various embodiments of the present disclosure.

FIG. 22 is an illustration of an online platform 2200 consistent with various embodiments of the present disclosure. By way of non-limiting example, the online platform 2200 to facilitate a gameplay may be hosted on a centralized server 2202, such as, for example, a cloud computing service. The centralized server 2202 may communicate with other network entities, such as, for example, a mobile device 2206 (such as a smartphone, a laptop, a tablet computer etc.), other electronic devices 2210 (such as desktop computers, server computers etc.), databases 2214, sensors 2216, an apparatus 2218 (such as the game piece 204, the game piece 1904, etc.) over a communication network 2204, such as, but not limited to, the Internet. Further, users of the online platform 2200 may include relevant parties such as, but not limited to, end-users, players, administrators, service providers, service consumers and so on. Accordingly, in some instances, electronic devices operated by the one or more relevant parties may be in communication with the platform.

A user 2212, such as the one or more relevant parties, may access online platform 2200 through a web based software application or browser. The web based software application may be embodied as, for example, but not be limited to, a website, a web application, a desktop application, and a mobile application compatible with a computing device 2300.

Figure 23:
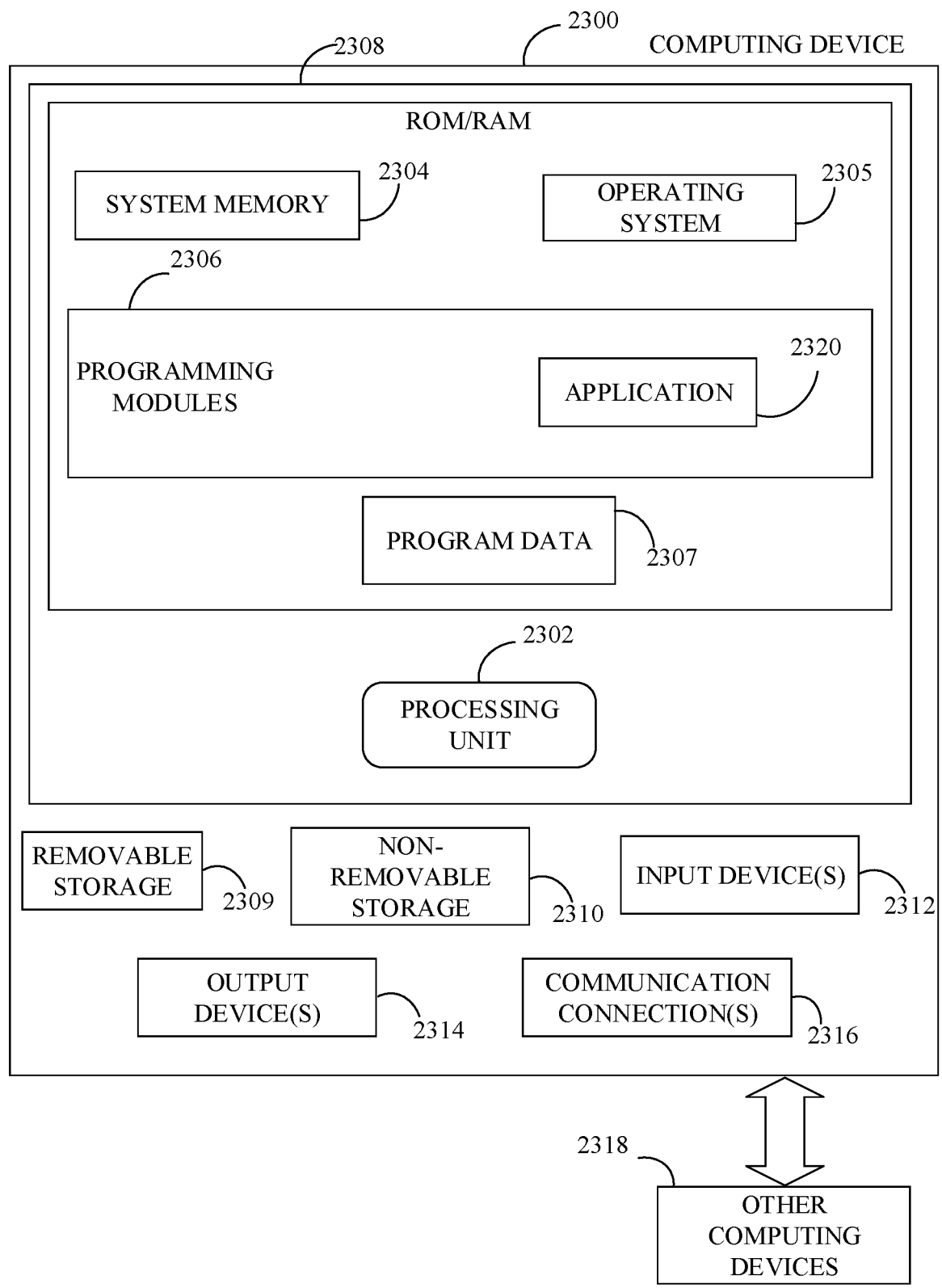
FIG. 23 is a block diagram of a computing device for implementing the methods disclosed herein, in accordance with some embodiments.

With reference to FIG. 23, a system consistent with an embodiment of the disclosure may include a computing device or cloud service, such as computing device 2300. In a basic configuration, computing device 2300 may include at least one processing unit 2302 and a system memory 2304. Depending on the configuration and type of computing device, system memory 2304 may comprise, but is not limited to, volatile (e.g. random-access memory (RAM)), non-volatile (e.g. read-only memory (ROM)), flash memory, or any combination. System memory 2304 may include operating system 2305, one or more programming modules 2306, and may include a program data 2307. Operating system 2305, for example, may be suitable for controlling computing device 2300's operation. In one embodiment, programming modules 2306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 23 by those components within a dashed line 2308.

Computing device 2300 may have additional features or functionality. For example, computing device 2300 may also include additional data storage devices (removable and/or non-removable) such as, for example, magnetic disks, optical disks, or tape. Such additional storage is illustrated in FIG. 23 by a removable storage 2309 and a non-removable storage 2310. Computer storage media may include volatile and non-volatile, removable and non-removable media implemented in any method or technology for storage of information, such as computer-readable instructions, data structures, program modules, or other data. System memory 2304, removable storage 2309, and non-removable storage 2310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2300. Any such computer storage media may be part of device 2300. Computing device 2300 may also have input device(s) 2312 such as a keyboard, a mouse, a pen, a sound input device, a touch input device, a location sensor, a camera, a biometric sensor, etc. Output device(s) 2314 such as a display, speakers, a printer, etc. may also be included. The aforementioned devices are examples and others may be used.

Computing device 2300 may also contain a communication connection 2316 that may allow device 2300 to communicate with other computing devices 2318, such as over a network in a distributed computing environment, for example, an intranet or the Internet. Communication connection 2316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2304, including operating system 2305. While executing on processing unit 2302, programming modules 2306 (e.g., application 2320 such as a media player) may perform processes including, for example, one or more stages of methods, algorithms, systems, applications, servers, databases as described above. The aforementioned process is an example, and processing unit 2302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. An apparatus for facilitating a gameplay, the apparatus comprising:
 a game board comprising at least one playing surface, wherein the at least one playing surface comprises a plurality of markings, wherein the plurality of markings corresponds to a plurality of information associated with the gameplay;
 a game piece comprising a plurality of piece surfaces, wherein the game piece is configured to be positioned on the at least one playing surface, wherein one of the plurality of piece surfaces is disposed over one of the plurality of markings based on the positioning of the game piece on the at least one playing surface, wherein the game piece comprises:
  at least one sensor configured for generating at least one sensor data based on the disposing of the one of the plurality of piece surfaces over the one of the plurality of markings; and
  a processing device communicatively coupled with the at least one sensor, wherein the processing device is configured for:
   analyzing the at least one sensor data; and
   identifying the one of the plurality of markings based on the analyzing;
  a storage device communicatively coupled with the processing device, wherein the storage device is configured for retrieving one of the plurality of information corresponding to the one of the plurality of markings based on the identifying; and
  at least one presentation device communicatively coupled with the storage device, wherein the at least one presentation device is configured for presenting the one of the plurality of information based on the retrieving; and
 wherein the game piece is thrown on the at least one playing surface by one of a plurality of players, wherein the positioning of the game piece on the at least one playing surface is further based on the throwing, wherein the at least one sensor is further configured for generating at least one first sensor data based on the throwing, wherein the processing device is further configured for:

analyzing the at least one first sensor data;

determining a current throw action of the one of the plurality of players based on the analyzing of the at least one first sensor data;

analyzing the current throw action and at least one previous throw action of the one of the plurality of players using at least one first machine learning model, wherein the at least one first machine learning model is trained in pattern detection;

determining a degree of similarity between the current throw action and the at least one previous throw action based on the analyzing of the current throw action and the at least one previous throw action;

determining a fairness of the throwing based on the determining of the degree of similarity; and generating a notification of the fairness of the throwing based on the determining of the fairness, wherein the storage device is further configured for retrieving the at least one previous throw action of the one of the plurality of players, wherein the at least one presentation device is further configured for presenting the notification.

2. The apparatus of claim 1, wherein the game piece is configured to be positioned on the at least one playing surface by the one of the plurality of players associated with the gameplay, wherein the processing device is further configured for:

analyzing the one of the plurality of information based on the retrieving; and generating a number of cryptocurrency tokens for the one of the plurality of players based on the analyzing of the plurality of information, wherein the game piece further comprises a communication device communicatively coupled with the processing device, wherein the communication device is configured for transmitting the number of cryptocurrency tokens to a player device associated with the one of the plurality of players.

3. The apparatus of claim 1, wherein the one of the plurality of piece surfaces is further disposed over at least a portion of the one of the plurality of markings based on the positioning of the game piece on the at least one playing surface, wherein the generating of the at least one sensor data is further based on the disposing of the one of the plurality of piece surfaces over at least the portion of the one of the plurality of markings, wherein the analyzing of the at least one sensor data comprises analyzing the at least one sensor data using the at least one first machine learning model, wherein the at least one first machine learning model is trained in pattern detection, wherein the identifying of the one of the plurality of markings is further based on the analyzing of the at least one sensor data using the at least one first machine learning model.

4. The apparatus of claim 1, wherein the game piece further comprises at least one communication interface communicatively coupled with the storage device, wherein the at least one communication interface is configured for receiving the plurality of information associated corresponding to the plurality of markings from at least one user device, wherein the storage device is further configured for storing the plurality of information, wherein the retrieving of the one of the plurality of information is further based on the storing of the plurality of information.

5. The apparatus of claim 1, wherein the plurality of piece surfaces corresponds to a plurality of piece information, wherein the at least one sensor further comprises a gyroscopic sensor, wherein the gyroscopic sensor is configured for generating at least one orientation data based on detecting an orientation of the game piece in relation to the at least one playing surface based on the disposing of the one of the plurality of piece surfaces over the one of the plurality of markings, wherein the at least one sensor data comprises the at least one orientation data, wherein the analyzing of the at least one sensor data comprises analyzing the at least one orientation data, wherein the processing device is further configured for identifying the one of the plurality of piece surfaces from the plurality of piece surfaces based on the analyzing of the at least one orientation data, wherein the storage device is further configured for retrieving one of the plurality of piece information corresponding to the one of the plurality of piece surfaces based the identifying of the one of the plurality of piece surfaces, wherein the at least one presentation device is further configured for presenting the one of the plurality of piece information.

6. The apparatus of claim 5, wherein the game piece further comprises at least one communication interface communicatively coupled with the storage device, wherein the at least one communication interface is configured for receiving the plurality of piece information associated corresponding to the plurality of piece surfaces from at least one user device, wherein the storage device is configured for storing the plurality of piece information, wherein the retrieving of the one of the plurality of piece information is further based on the storing of the plurality of piece information.

7. The apparatus of claim 1, wherein the game piece comprises at least one three-dimensional object, wherein the at least one three-dimensional object comprises a plurality of panels, wherein the plurality of panels is arranged in at least one configuration for forming one of the at least one three-dimensional object, wherein a plurality of external surfaces of the plurality of panels forms the plurality of piece surfaces.

8. The apparatus of claim 7, wherein the at least one presentation device further comprises a plurality of display devices corresponding to the plurality of piece surfaces, wherein the plurality of display devices is comprised in the plurality of external surfaces of the plurality of panels.

9. The apparatus of claim 7, wherein the plurality of panels is configured to be connected in the at least one configuration using at least one connector for the forming of the one of the at least one three-dimensional object, wherein the at least one connector comprises at least one fastener, wherein the at least one fastener is configured for attaching the one of the plurality of panels to at least one of the plurality of panels, wherein the forming of the one of the at least one three-dimensional object is further based on the attaching.

10. The apparatus of claim 7, wherein the at least one three-dimensional object comprises a plurality of three-dimensional objects, wherein one of the plurality of three-dimensional objects is configured to be attached to at least one of the plurality of three-dimensional objects in at least one object configuration using at least one object connector for forming the game piece.

11. An apparatus for facilitating a gameplay, the apparatus comprising:

a game board comprising at least one playing surface, wherein the at least one playing surface comprises a plurality of markings, wherein the plurality of markings corresponds to a plurality of information associated with the gameplay;

a game piece comprising a plurality of piece surfaces, wherein the game piece is configured to be positioned on the at least one playing surface, wherein one of the plurality of piece surfaces is disposed over one of the plurality of markings based on the positioning of the game piece on the at least one playing surface, wherein the game piece comprises at least one three-dimensional object, wherein the at least one three-dimensional object comprises a plurality of panels, wherein the plurality of panels is arranged in at least one configuration for forming one of the at least one three-dimensional object, wherein a plurality of external surfaces of the plurality of panels forms the plurality of piece surfaces, wherein the game piece comprises:

at least one sensor configured for generating at least one sensor data based on the disposing of the one of the plurality of piece surfaces over the one of the plurality of markings; and a processing device communicatively coupled with the at least one sensor, wherein the processing device is configured for:
 analyzing the at least one sensor data; and
 identifying the one of the plurality of markings based on the analyzing;

a storage device communicatively coupled with the processing device, wherein the storage device is configured for retrieving one of the plurality of information corresponding to the one of the plurality of markings based on the identifying; and at least one presentation device communicatively coupled with the storage device, wherein the at least one presentation device is configured for presenting the one of the plurality of information based on the retrieving; and wherein the game piece is thrown on the at least one playing surface by one of a plurality of players, wherein the positioning of the game piece on the at least one playing surface is further based on the throwing, wherein the at least one sensor is further configured for generating at least one first sensor data based on the throwing, wherein the processing device is further configured for:

analyzing the at least one first sensor data;

determining a current throw action of the one of the plurality of players based on the analyzing of the at least one first sensor data;

analyzing the current throw action and at least one previous throw action of the one of the plurality of players using at least one first machine learning model, wherein the at least one first machine learning model is trained in pattern detection;

determining a degree of similarity between the current throw action and the at least one previous throw action based on the analyzing of the current throw action and the at least one previous throw action;

determining a fairness of the throwing based on the determining of the degree of similarity; and generating a notification of the fairness of the throwing based on the determining of the fairness, wherein the storage device is further configured for retrieving the at least one previous throw action of the one of the plurality of players, wherein the at least one presentation device is further configured for presenting the notification.

12. The apparatus of claim 11, wherein the one of the plurality of piece surfaces is further disposed over at least a portion of the one of the plurality of markings based on the positioning of the game piece on the at least one playing surface, wherein the generating of the at least one sensor data is further based on the disposing of the one of the plurality of piece surfaces over at least the portion of the one of the plurality of markings, wherein the analyzing of the at least one sensor data comprises analyzing the at least one sensor data using the at least one first machine learning model, wherein the at least one first machine learning model is trained in pattern detection, wherein the identifying of the one of the plurality of markings is further based on the analyzing of the at least one sensor data using the at least one first machine learning model.

13. The apparatus of claim 11, wherein the game piece further comprises at least one communication interface communicatively coupled with the storage device, wherein the at least one communication interface is configured for receiving the plurality of information associated corresponding to the plurality of markings from at least one user device, wherein the storage device is further configured for storing the plurality of information, wherein the retrieving of the one of the plurality of information is further based on the storing of the plurality of information.

14. The apparatus of claim 11, wherein the plurality of piece surfaces corresponds to a plurality of piece information, wherein the at least one sensor further comprises a gyroscopic sensor, wherein the gyroscopic sensor is configured for generating at least one orientation data based on detecting an orientation of the game piece in relation to the at least one playing surface based on the disposing of the one of the plurality of piece surfaces over the one of the plurality of markings, wherein the at least one sensor data comprises the at least one orientation data, wherein the analyzing of the at least one sensor data comprises analyzing the at least one orientation data, wherein the processing device is further configured for identifying the one of the plurality of piece surfaces from the plurality of piece surfaces based on the analyzing of the at least one orientation data, wherein the storage device is further configured for retrieving one of the plurality of piece information corresponding to the one of the plurality of piece surfaces based the identifying of the one of the plurality of piece surfaces, wherein the at least one presentation device is further configured for presenting the one of the plurality of piece information.

15. The apparatus of claim 14, wherein the game piece further comprises at least one communication interface communicatively coupled with the storage device, wherein the at least one communication interface is configured for receiving the plurality of piece information associated corresponding to the plurality of piece surfaces from at least one user device, wherein the storage device is configured for storing the plurality of piece information, wherein the retrieving of the one of the plurality of piece information is further based on the storing of the plurality of piece information.

16. The apparatus of claim 11, wherein the at least one presentation device further comprises a plurality of display devices corresponding to the plurality of piece surfaces, wherein the plurality of display devices is comprised in the plurality of external surfaces of the plurality of panels.

17. The apparatus of claim 11, wherein the plurality of panels is configured to be connected in the at least one configuration using at least one connector for the forming of the one of the at least one three-dimensional object, wherein the at least one connector comprises at least one fastener, wherein the at least one fastener is configured for attaching the one of the plurality of panels to at least one of the plurality of panels, wherein the forming of the one of the at least one three-dimensional object is further based on the attaching.

18. The apparatus of claim 11, wherein the at least one three-dimensional object comprises a plurality of three-dimensional objects, wherein one of the plurality of three-dimensional objects is configured to be attached to at least one of the plurality of three-dimensional objects in at least one object configuration using at least one object connector for forming the game piece.

* * * * *